(12) United States Patent
Garimella et al.

(10) Patent No.: US 10,947,914 B2
(45) Date of Patent: Mar. 16, 2021

(54) REFERENCE VALUE ENGINE CONTROL SYSTEMS AND METHODS

(71) Applicant: CUMMINS INC., Columbus, IN (US)

(72) Inventors: Phanindra V. Garimella, Bloomington, IN (US); Paul V. Moonjelly, Columbus, IN (US); Edmund P. Hodzen, Columbus, IN (US); Ming-feng Hsieh, Nashville, IN (US); Gayatri Adi, Columbus, IN (US); Gokul Vishwanathan, Olney, MD (US)

(73) Assignee: Cummins Inc., Columbus, IN (US)

( * ) Notice: Subject to any disclaimer, the term of this patent is extended or adjusted under 35 U.S.C. 154(b) by 103 days.

(21) Appl. No.: 15/762,465

(22) PCT Filed: Oct. 14, 2015

(86) PCT No.: PCT/US2015/055447
§ 371 (c)(1),
(2) Date: Mar. 22, 2018

(87) PCT Pub. No.: WO2017/065754
PCT Pub. Date: Apr. 20, 2017

(65) Prior Publication Data
US 2018/0266343 A1 Sep. 20, 2018

(51) Int. Cl.
*F02D 41/00* (2006.01)
*F02D 41/14* (2006.01)
(Continued)

(52) U.S. Cl.
CPC ......... *F02D 41/0047* (2013.01); *F02D 35/02* (2013.01); *F02D 35/025* (2013.01);
(Continued)

(58) Field of Classification Search
CPC ............ F02D 41/0002; F02D 41/0007; F02D 41/0047; F02D 41/005; F02D 41/0052;
(Continued)

(56) References Cited

U.S. PATENT DOCUMENTS 6,026,793 A 2/2000 Yasui et al.
6,397,830 B1 6/2002 Dohta
(Continued)

FOREIGN PATENT DOCUMENTS

CN 104603434 A 5/2015
JP 4961336 6/2012
(Continued)

OTHER PUBLICATIONS

Extended European Search Report issued by the European Patent Office, dated Jun. 12, 2019, for European Patent Application No. 15906365.0; 7 pages.
(Continued)

*Primary Examiner* — Erick R Solis
(74) *Attorney, Agent, or Firm* — Faegre Drinker Biddle & Reath LLP

(57) ABSTRACT

Methods and apparatuses for calibration and control of various engine subsystems using a target value approach. Under the target value approach, the control of each engine subsystem is separated or decoupled to include a set of target values, or a reference value set. A subsystem has a corresponding target determiner, which provides a target value set, or reference value set, in response to a basis variable set and optionally an overall subsystem target. The basis variable set includes parameters selected to robustly characterize the variables that affect the operation of the particular subsystem. The target determiner is optionally calibrated to provide a reference value set within specifications of the
(Continued)

subsystem. A physical subsystem controller operates in response to the reference value set.

43 Claims, 10 Drawing Sheets

(51) Int. Cl.
  *F02D 41/24* (2006.01)
  *F02D 41/38* (2006.01)
  *F02D 41/40* (2006.01)
  *F02D 35/02* (2006.01)

(52) U.S. Cl.
  CPC ....... *F02D 41/0002* (2013.01); *F02D 41/005* (2013.01); *F02D 41/0007* (2013.01); *F02D 41/0052* (2013.01); *F02D 41/1446* (2013.01); *F02D 41/1454* (2013.01); *F02D 41/1462* (2013.01); *F02D 41/2432* (2013.01); *F02D 41/3836* (2013.01); *F02D 41/401* (2013.01); *F02D 2041/0017* (2013.01); *F02D 2041/1412* (2013.01); *F02D 2041/1433* (2013.01); *F02D 2200/101* (2013.01); *F02D 2250/31* (2013.01); *F02D 2250/36* (2013.01); *Y02T 10/12* (2013.01); *Y02T 10/40* (2013.01)

(58) Field of Classification Search
  CPC ............. F02D 41/1446; F02D 41/1454; F02D 41/1462; F02D 2041/0017
  USPC ........................................................ 701/102
  See application file for complete search history.

(56) References Cited

U.S. PATENT DOCUMENTS

| | | | |
|---|---|---|---|
| 6,725,650 | B2 | 4/2004 | Nishimura |
| 7,337,060 | B2 | 2/2008 | Kienle et al. |
| 7,457,701 | B2 | 11/2008 | Tanaka |
| 7,756,688 | B2 | 7/2010 | Averill et al. |
| 7,813,867 | B2 | 10/2010 | Yasui et al. |
| 8,256,206 | B2 | 9/2012 | Wada et al. |
| 8,478,507 | B2 | 7/2013 | Sata |
| 9,133,811 | B2 | 9/2015 | Takahashi et al. |
| 9,435,274 | B2* | 9/2016 | Wong ................... F02D 41/1401 |
| 9,732,688 | B2* | 8/2017 | Cygan, Jr. ............ F02D 41/0255 |
| 9,863,345 | B2* | 1/2018 | Wong ................... F02D 41/0087 |
| 9,863,352 | B2* | 1/2018 | Stenlaas ................ B60W 10/00 |
| 10,035,500 | B2* | 7/2018 | Stenlaas ................ B60W 10/02 |
| 2005/0022510 | A1 | 2/2005 | Nakagawa et al. |
| 2005/0161032 | A1 | 7/2005 | Nakagawa et al. |
| 2007/0017210 | A1 | 1/2007 | Hirata et al. |
| 2007/0245714 | A1 | 10/2007 | Frazier et al. |
| 2008/0172169 | A1 | 7/2008 | Kuronita et al. |
| 2009/0007888 | A1 | 1/2009 | Sarlashkar et al. |
| 2009/0178656 | A1 | 7/2009 | Saitoh |
| 2009/0223205 | A1 | 9/2009 | Grissom et al. |
| 2009/0287390 | A1 | 11/2009 | Mizuno et al. |
| 2010/0024390 | A1 | 2/2010 | Wills |
| 2010/0024787 | A1 | 2/2010 | Chi |
| 2010/0043400 | A1 | 2/2010 | Wang et al. |
| 2010/0043402 | A1 | 2/2010 | Perry et al. |
| 2010/0168983 | A1 | 7/2010 | Ruiz |
| 2010/0235141 | A1 | 9/2010 | Wang et al. |
| 2010/0242440 | A1 | 9/2010 | Garimella |
| 2011/0016849 | A1 | 1/2011 | Runde et al. |
| 2011/0162350 | A1 | 7/2011 | Ponnathpur |
| 2011/0162628 | A1 | 7/2011 | Kurtz et al. |
| 2011/0184632 | A1 | 7/2011 | Kang et al. |
| 2011/0214650 | A1 | 9/2011 | Wang et al. |
| 2011/0264353 | A1 | 10/2011 | Atkinson et al. |
| 2012/0137660 | A1 | 6/2012 | Yan et al. |
| 2013/0024094 | A1 | 1/2013 | Shaver et al. |
| 2013/0029852 | A1 | 1/2013 | Rava et al. |
| 2013/0067894 | A1 | 3/2013 | Pekar et al. |
| 2013/0226420 | A1 | 8/2013 | Pedlar et al. |
| 2013/0298525 | A1 | 11/2013 | Lim et al. |
| 2014/0058645 | A1 | 2/2014 | Stroh et al. |
| 2014/0109868 | A1 | 4/2014 | Zhu et al. |
| 2014/0260190 | A1 | 9/2014 | DeGeorge |
| 2015/0128683 | A1 | 5/2015 | Kumano et al. |
| 2015/0167567 | A1 | 6/2015 | Stroh et al. |
| 2016/0123258 | A1 | 5/2016 | Lack et al. |
| 2016/0281574 | A1 | 9/2016 | Abel et al. |
| 2018/0266340 | A1 | 9/2018 | Garimella et al. |
| 2018/0266348 | A1 | 9/2018 | Garimella et al. |
| 2018/0274467 | A1 | 9/2018 | Garimella et al. |
| 2018/0274475 | A1 | 9/2018 | Garimella et al. |
| 2018/0347497 | A1 | 12/2018 | Moore et al. |

FOREIGN PATENT DOCUMENTS

| | | |
|---|---|---|
| WO | 20131032844 A1 | 3/2013 |
| WO | 2014/055307 | 4/2014 |
| WO | WO 2014/193333 | 12/2014 |

OTHER PUBLICATIONS

International Preliminary Report on Patentability dated Apr. 17, 2018 in corresponding International Application No. PCT/US2015/055447.

International Search Report and Written Opinion dated Dec. 31, 2015 in PCT/US2015/055447.

Vu et al.; "A Model Predictive Control Approach for Fuel Economy Improvement of a Series Hydraulic Hybrid Vehicle", in: Engines, Oct. 31, 2014.

Mancini et al.; "Dynamic Feedforward Control of a Diesel Engine Based on Optimal Transient Compensation Maps", in: Engines, Aug. 21, 2014.

Delgado et al., "Advanced Tractor-Trailer Efficiency Technology Potential in the 2020-2030 Timeframe", The International Council on Clean Transportation. Washington, DC, Apr. 2015.

Christen, et al.; "IMO Tier 3; Gas and Dual Fuel Engines as a Clean and Efficient Solution", CIMAC Congress 2013.

Cieslar, "Control for Transient Response of Turbocharged Engines", University of Cambridge, Mar. 2013.

Non-Final Office Action issued by the United States Patent and Trademark Office dated Jan. 2, 2020 in U.S. Appl. No. 15/762,461; 34 pages.

Final Office Action issued by the United States Patent and Trademark Office dated May 1, 2020 in U.S. Appl. No. 15/762,467; 16 pages.

Notice of Allowance and Fee(s) Due issued by the United States Patent and Trademark Office dated Feb. 20, 2020 in U.S. Appl. No. 15/762,469; 21 pages.

Notice of Allowance and Fee(s) Due issued by the United States Patent and Trademark Office dated May 15, 2020 in U.S Appl. No. 15/762,472; 5 pages.

European Search Report and Search Opinion Received for EP Application No. 15906363.5, dated Jun. 5, 2019, 7 pages.

International Preliminary Report on Patentability received for PCT Patent Application No. PCT/US2015/055445, dated Apr. 26, 2018, 12 pages.

International Preliminary Report on Patentability received for PCT Patent Application No. PCT/US2015/055448, dated Apr. 26, 2018, 9 pages.

International Preliminary Report on Patentability received for PCT Patent Application No. PCT/US2015/055451, dated Apr. 26, 2018, 13 pages.

International Preliminary Report on Patentability received for PCT Patent Application No. PCT/US2015/055452, dated Apr. 26, 2018, 14 pages.

International Search Report and Written Opinion dated Dec. 28, 2015 in PCT/US2015/055451.

International Search Report and Written Opinion dated Dec. 28, 2015 in PCT/US2015/055452.

(56) References Cited

OTHER PUBLICATIONS

International Search Report and Written Opinion dated Dec. 29, 2015 in PCT/US2015/055445.
International Search Report and Written Opinion dated Feb. 2, 2016 in PCT/US2015/055448.

* cited by examiner

REFERENCE VALUE ENGINE CONTROL SYSTEMS AND METHODS

RELATED APPLICATIONS

The present application is a national phase filing under 35 U.S.C. § 371 of International Application No. PCT/US2015/055447, titled "REFERENCE VALUE ENGINE CONTROL SYSTEMS AND METHODS," filed on Oct. 14, 2015, the entire disclosure of which being expressly incorporated herein by reference.

The present application discloses subject matter similar to the subject matter disclosed in the following applications: U.S. application Ser. No. 15/762,461, filed Mar. 22, 2018, which is a National Stage Entry of PCT/US2015/055445; U.S. application Ser. No. 15/762,469 filed Mar. 22, 2018, which is a National Stage Entry of PCT/US2015/055451; U.S. application Ser. No. 15/762,472 filed Mar. 22, 2018, which is a National Stage Entry of PCT/US2015/055452; and U.S. application Ser. No. 15/762,467 filed Mar. 22, 2018, which is a National Stage Entry of PCT/US2015/055448.

TECHNICAL FIELD

The present disclosure relates generally to internal combustion engines. In particular, the disclosure relates to control of internal combustion engines using subsystem target values.

BACKGROUND

Engine systems including internal combustion engines are often required to meet performance in several areas. While delivering requested amounts of power, engines are also often required to operate efficiently in terms of resource consumption and meet low emission requirements, such as EPA Tier 4 Final requirements for smoke and $NO_X$ emissions. These goals are often governed by trade-offs, such as targeting greater power delivery while also targeting less fuel consumption. The design of the engine system often includes one or more subsystems to balance, or optimize, these performance requirements. For example, a subsystem may be a fuel system, an air handling system, and an aftertreatment system. Engine systems are often calibrated to meet performance requirements under varying conditions, such as during steady state versus transient state, or at various altitudes. With increasing performance requirements, there remains a continuing need to robustly calibrate and operate engine systems to provide power with minimal resource consumption while meeting emissions requirements.

SUMMARY

Aspects of various embodiments relate to a method comprising: interpreting a basis variable set, the basis variable set including an engine speed, a commanded fueling value, an in-cylinder oxygen concentration value, and oxygen-to-fuel ratio value; determining a reference value set in response to the basis variable set and a fuel controller specification set, wherein the reference value set includes a start-of-injection command; and providing the reference value set to a fuel control commander. The reference value set optionally includes a rail pressure command.

Some embodiments relate to an apparatus comprising: a combustion parameter definer structured to interpret a basis variable set, the basis variable set including an engine speed, a commanded fueling value, and an in-cylinder oxygen concentration value; a fueling target determiner structured to determine a reference value set in response to the basis variable set and a fuel controller specification set, wherein the reference value set includes a start-of-injection command; and a fuel control circuit structured to provide at least one fueling command value in response to the reference value set.

Further embodiments relate to an engine system, comprising an internal combustion engine; a controller; and a fuel system in operative communication with the engine and the controller, the fuel system structured to provide fuel to the engine in response to the at least one fueling command value. The controller is configured to interpret a basis variable set, the basis variable set including an engine speed, a commanded fueling value, and an in-cylinder oxygen concentration value; determine a reference value set in response to the basis variable set and a fuel controller specification set, wherein the reference value set includes a start-of-injection command; and provide at least one fueling command value in response to the reference value set.

Aspects of various embodiments relate to a method, comprising: interpreting a basis variable set, the basis variable set including a predicted engine speed trajectory, a predicted fueling trajectory, and an ambient value; determining a reference value set in response to the basis variable set and an air handling controller specification set, wherein the reference value set includes a mass charge flow (MCF) value; and providing the reference value set to an air handling control commander.

The method optionally further comprises determining a steady state reference value set in response to the basis variable set and the air handling controller specification set; and providing the steady state reference value set as an initial design reference value set. Yet further, the method optionally comprises interpreting a threshold criteria set, wherein the threshold criteria set includes at least one of an objective value subset and a constraint value subset; checking for a threshold criteria violation in response to the predictive model output set and the threshold criteria set; and determining the reference value set further in response to the checking for the threshold criteria violation. Yet further still, the method optionally comprises constraining the design reference value set in response to a target BTE trajectory; and determining the reference value set further in response to the constrained design reference value set.

Some embodiments relate to an apparatus, comprising: an air handling parameter definer structured to interpret a basis variable set, the basis variable set including a predicted engine speed trajectory, a predicted fueling trajectory, and an ambient value; an air handling target determiner structured to determine a reference value set in response to the basis variable set and an air handling controller specification set, wherein the reference value set includes at least one of a mass charge flow value; and an air handling control circuit structured to provide at least one air handling command value in response to the reference value set.

Further embodiments relate to an engine system, comprising: an internal combustion engine; a controller; and an air handling system in operative communication with the engine and the controller, the air handling system structured to provide air to the engine in response to the at least one air handling command value. The controller is configured to interpret a basis variable set, the basis variable set including a predicted engine speed trajectory, a predicted fueling trajectory, and an ambient value; determine a reference value set in response to the basis variable set and an air handling controller specification set, wherein the reference value set includes at least one of a mass charge flow value and a pumping work target; and provide at least one air handling command value in response to the reference value set.

Aspects of various embodiments relate to a method, comprising: interpreting a basis variable set, the basis variable set including a space-velocity value, an exhaust related temperature, and an ambient value; determining a reference value set in response to the basis variable set and an aftertreatment controller specification set, wherein the reference value set includes at least one of a $NO_X$ conversion efficiency value and a system out $NO_X$ value; and providing the reference value set to an aftertreatment control commander.

The method optionally further comprises determining a steady state reference value set in response to the basis variable set and the aftertreatment controller specification set; providing the steady state reference value set as an initial design reference value set. Yet further, the method optionally comprises interpreting an aggregate emissions trajectory; constraining the design reference value set in response to the aggregate emissions trajectory and the predictive model output; and determining the reference value set further in response to the constrained design reference value set.

Some embodiments relate to an apparatus comprising: an aftertreatment parameter definer structured to interpret a basis variable set, the basis variable set including a space-velocity value, an exhaust related temperature, and an ambient value; an aftertreatment target determiner structured to determine a reference value set in response to the basis variable set and an aftertreatment controller specification set, wherein the reference value set includes at least one of a $NO_X$ conversion efficiency value and a system out $NO_X$ value; and an aftertreatment control circuit structured to provide at least one aftertreatment command value in response to the reference value set.

Further embodiments relate to an engine system comprising: an internal combustion engine; a controller; and an aftertreatment system in operative communication with the engine and the controller, the aftertreatment system structured to treat exhaust from the internal combustion engine in response to at least one aftertreatment command value. The controller is configured to interpret a basis variable set, the basis variable set including a space-velocity value, an exhaust related temperature, and an ambient value; determine a reference value set in response to the basis variable set and an aftertreatment controller specification set, wherein the reference value set includes at least one of a $NO_X$ conversion efficiency value and a system out $NO_X$ value; and provide at least one aftertreatment command value in response to the reference value set.

While multiple embodiments are disclosed, still other embodiments of the present invention will become apparent to those skilled in the art from the following detailed description, which shows and describes illustrative embodiments of the invention.

Figure 1:
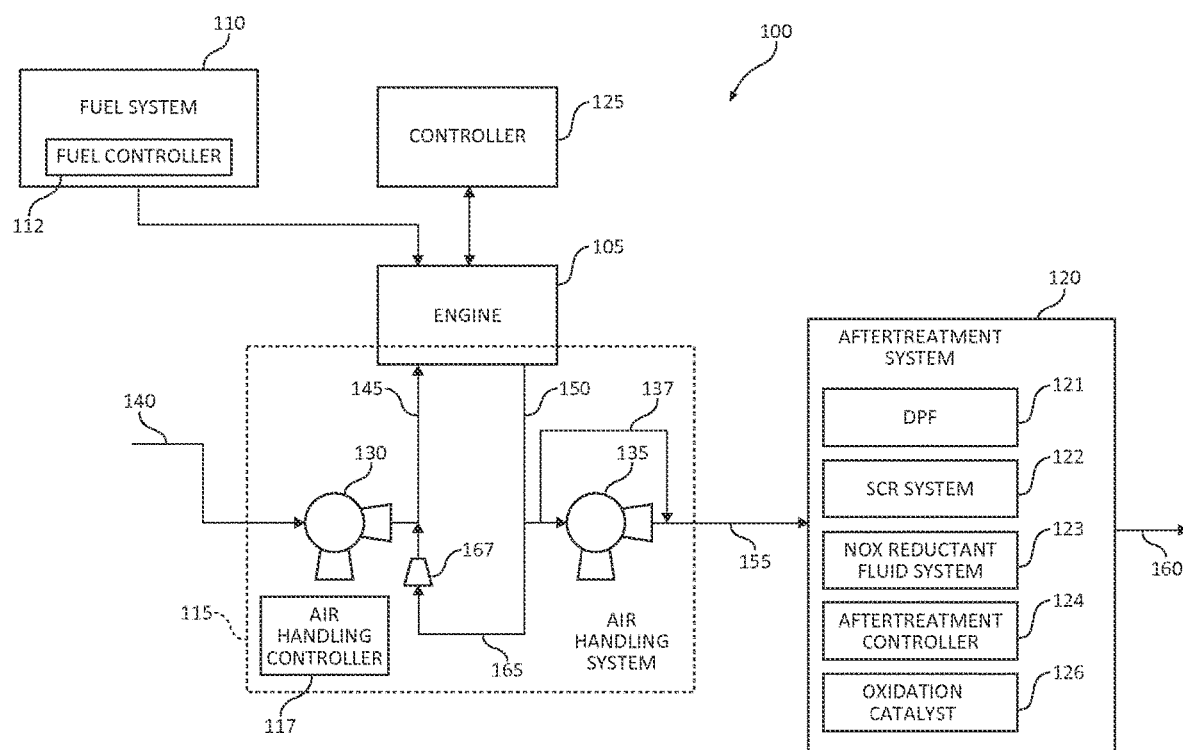
FIG. 1 is a schematic illustration of an engine system including an internal combustion engine, according to some embodiments of the disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic illustration of an engine system 100 utilizing reference values to control system performance, according to some embodiments of the disclosure. The system 100 cooperatively controls system components, such as subsystems, to provide engine performance within a specification or a requirement set of the system 100. As shown, the system 100 includes an engine 105 and various subsystems, such as a fuel system 110, an air handling system 115, and an aftertreatment system 120. An example system 100 includes a controller 125 (e.g., ECM) in operative communication with the engine 105, which provides and receives signals related to various engine components, such as receiving measurement signals from sensors disposed in the engine 105 and providing control signals or commands to the subsystems. The controller 125 may also be in operative communication with other components of the system 100, such as the subsystems 110, 115, 120, in a similar manner. As used herein throughout, operative communication means an operative coupling by wire, wirelessly, mechanically, electronically, optically, magnetically, by network, et cetera, or any suitable combinations thereof.

The system 100 decouples the generation of target values from the generation of command values. For example, the system 100 generates one or more reference values in response to one or more basis variables. The one or more reference values are target values for a particular component's performance. Though many variables can affect a particular component's performance, one or more key basis variables are selected to characterize a majority of effects of the particular component. The key basis variables may be used for calibrating the reference values to respond to a variety of engine conditions, including steady state and transient state, while only calibrating for the engine 105 at steady state conditions and optionally a limited number of transient states.

In response to the one or more generated reference values, one or more commands are generated. The command values are calibrated to the particular component for which they are being generated. The commands can be provided to the particular component, which may reside, for example, in a subsystem. Utilizing key basis variables and decoupling target values from calibrated command values facilitates the time-efficient calibration of the system 100 and the potential for less-intensive processing-power to operate the system 100 while balancing and meeting performance in several areas. More detail of basis variables, reference values, and commands to facilitate these advantages are provided herein.

Turning now to provide more detail of the components of the system 100, the fuel system 110 is in operative communication with the engine 105 and provides fuel for combustion. The fuel system 110 delivers a fueling amount at one or more specific times to one or more cylinders during each combustion cycle. In some embodiments, the fuel is fed through an injector directly into an engine cylinder, for example, when the engine 105 uses diesel fuel. In other embodiments, the fuel is mixed with air charge before entering an engine cylinder, for example, when the engine 105 uses gasoline or natural gas fuel. At least one physical component of the fuel system 110 is controlled by physical fuel controller 112. The fuel controller 112 provides control signals to the physical components of the fuel system 110, such as a fuel pressure pump and fuel injectors, in response to one or more fueling command values.

The air handling system 115 provides air to the engine 105 for combustion with fuel. An example air handling system 115 includes an air handling controller 117 in operative communication with one or more components of the air handling system to provide control signals to the physical air handling system components in response to one or more command values. As illustrated, the air handling system 115 includes an optional turbocharging system including at least one turbocharger, each including a compressor 130 and a turbine 135. The turbocharging system receives exhaust and provides compressed air. In some embodiments, the compressor 130 is driven by the turbine 135 in a turbocharging configuration, wherein the compressor 130 is the air intake side of a turbocharger and the turbine 135 is the exhaust side of the turbocharger. In various embodiments, the turbocharging system of the air handling system 115 includes a waste gate 137 for bypassing the turbine 135 to control the speed of the turbine 135 and compressor 130, for example, to avoid excessive speed. In other embodiments, the turbocharging system includes a variable geometry turbocharger (VGT), which facilitates controlling the speed of the turbine 135 and compressor 130.

The example system includes a wastegate turbocharger. However, the airhandling system 115 may include any type of air handling system, including without limitation a naturally aspirated system, a fixed geometry turbocharger, a variable geometry turbocharger, a compressor bypass turbocharger, a dual turbocharger (series or parallel), and combinations thereof.

The system 100 includes a system air intake 140 into which air enters from the ambient environment. The air flows into and out of the compressor 130 to engine air intake 145. The engine 105 may include an intake manifold operatively coupled to the engine air intake 145 to deliver the air to the intake ports of the cylinders. The system may include an intercooler, charger air cooler (not shown), and/or bypass systems therefore. After combustion, exhaust flows from the engine 105 to engine exhaust 150. The engine 105 may include an exhaust manifold operatively coupled to the exhaust ports of the cylinders to collect the exhaust and direct the exhaust to the engine exhaust 150.

Some of the exhaust is directed into an exhaust gas recirculation (EGR) system that is also part of the air handling system 115. The EGR system directs a portion of the exhaust to EGR pathway 165 to engine air intake 145. The EGR system may include an EGR valve 167 to control the flow (e.g., external EGR fraction) of exhaust gases back to the engine air intake 145. The example EGR system is a high pressure EGR system having the EGR pathway 165 being coupled upstream of the turbine 135 and downstream of the compressor 130. Some embodiments, alternatively or in addition, include a low pressure EGR system having the EGR pathway 165 being coupled downstream of the turbine 135 and upstream of the compressor 130. The exhaust flows into and out of the turbine 135 to aftertreatment inlet 155.

The example EGR system may additionally or alternatively include an EGR cooler (not shown) structured to cool the exhaust in the EGR pathway 165. The EGR valve 167 may be positioned upstream (hotside) or downstream (coolside) of the EGR cooler. Where present, the EGR cooler may additionally be provided with a bypass valve.

The aftertreatment system 120 receives the exhaust from aftertreatment inlet 155 and at least a portion of the exhaust is expelled at the aftertreatment outlet 160, which may also be referred to as the system outlet or tailpipe. The aftertreatment system 120 includes devices to treat emissions before exiting the tailpipe, such as one or more of a particulate filter or diesel particulate filter (DPF) 121, a selective catalytic reduction (SCR) system 122 to chemically reduce components of the exhaust, a $NO_X$ reductant fluid system 123 (e.g., a diesel exhaust fluid system) to provide $NO_X$ reductant fluid to the exhaust, and an oxidation catalyst 126 to chemically oxidize components of the exhaust. The aftertreatment controller 124 is in operative communication with one or more of the aftertreatment components 121, 122, 123, 126 to provide control signals to at least one physical component of the aftertreatment system in response to one or more command values. The EGR system may also be considered part of the aftertreatment system 120.

The controller 125 performs certain operations to control one or more subsystems of an internal combustion engine, such as one or more of a fuel system 110, an air handling system 115, and an aftertreatment system 120. In certain embodiments, the controller 125 forms a portion of a processing subsystem including one or more computing devices having memory, processing, and communication hardware. The controller 125 may be a single device or a distributed device, and the functions of the controller may be performed by hardware and/or as computer instructions on a non-transient computer readable storage medium.

The logical relationship among the controllers and their functionality may be implemented in any known manner. Physical controllers 112, 117, and 124 are shown as separate from controller 125 in FIG. 1. However, any number of these controllers may alternatively be implemented as part of controller 125. For example, the controllers may be implemented in a single physical device, or in another example, as a distributed device.

In certain embodiments, the controller 125 includes one or more definers, determiners, commanders, and circuits that functionally execute the operations of the controller. The description herein including definers, determiners, commanders, and/or circuits emphasizes the structural independence of certain aspects of the controller 125, and illustrates one grouping of operations and responsibilities of the controller. Other groupings that execute similar overall operations are understood within the scope of the present application. Definers, determiners, commanders, and/or circuits may be implemented in hardware and/or as computer instructions on a non-transient computer readable storage medium and may be distributed across various hardware or computer based components.

Example and non-limiting implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to a specification, any actuator including at least an electrical, hydraulic, or pneumatic actuator, a solenoid, an op-amp, analog control elements (springs, filters, integrators, adders, dividers, gain elements), and/or digital control elements.

Figure 2:
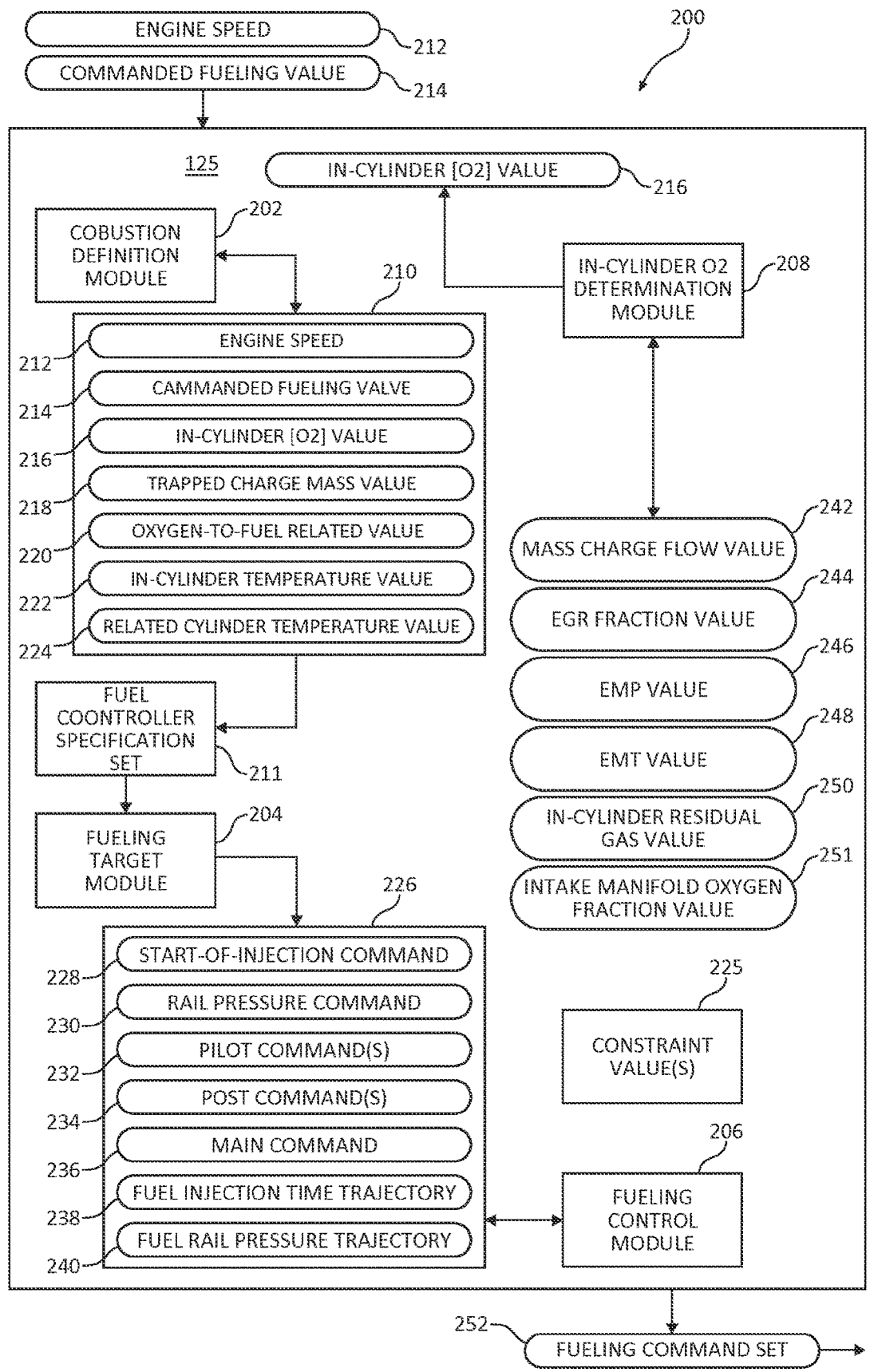
FIG. 2 is a schematic illustration of a processing subsystem of the engine system of FIG. 1, according to some embodiments.

FIG. 2 is a schematic illustration of an example processing subsystem 200 including a controller 125 to perform certain operations to control the fuel subsystem 110, according to some embodiments. The controller 125 includes one or more definers, determiners, commanders, and/or circuits such as a combustion parameter definer 202, a fueling target determiner 204, and a fueling commander 206. The combustion parameter definer 202 interprets one or more basis variables for fueling. An example basis variable set 210 characterizes closed cycle efficiency (CCE), which considers the efficiency of combustion within the cylinder. The fueling target determiner 204 determines a fueling reference value set 226 in response to a key basis variable set 210 for fueling. An example reference value set 226 corresponds to target values for the fuel system 110. Some target values are conformed to the specification set 211 of one or more physical controllers of the fuel system 110. The fuel control commander 206 (e.g., a fuel control circuit) provides a fueling command set 252 including one or more fueling command values in response to a reference value set 226 for fueling. An example command value set 252 is optionally a modified version of the reference value set 226 due to limits or constraints (e.g., constraint value(s) 225) identified by the fuel control commander 206. Further, the fuel system 110 may fuel the internal combustion engine 105 in response to the reference value set 226 upon receiving the one or more values of the fueling command set 252.

Further embodiments of the controller 125 include an in-cylinder oxygen concentration ($[O_2]$) determiner 208 to provide an in-cylinder $[O_2]$ value 216, which may be included as a key basis variable. The in-cylinder oxygen determiner 208 interprets or determines an in-cylinder $[O_2]$ value 216. An example in-cylinder oxygen determiner 208 determines the in-cylinder $[O_2]$ value 216 in response to one or more of a mass charge flow value 242 and an engine speed 212. In additional embodiments, the in-cylinder $[O_2]$ value 216 is determined further in response to one or more of an exhaust gas recirculation (EGR) fraction value 244 (e.g., internal or external EGR fraction), an exhaust manifold pressure (EMP) value 246, an exhaust manifold temperature (EMT) value 248. In yet further embodiments, the in-cylinder $[O_2]$ value 216 is determined in response to one or more of an in-cylinder residual gas value 250 and an intake manifold oxygen fraction value 251.

The example in-cylinder residual gas value 250 characterizes the amount of one or more gases already in the cylinder during intake (e.g., residual gases from the previous cycle). The example in-cylinder residual gas value 250 includes one or more of an oxygen value, a charge value, an exhaust value, or an air value. Such values may be, for example, an amount, a concentration, or a ratio. Exhaust may be a residual gas due to external EGR or internal EGR, for example. Internal EGR is the amount of exhaust gas left over in the cylinder from the previous combustion.

The present disclosure recognizes that an in-cylinder $[O_2]$ value 216 may be measured directly or determined by a virtual sensor. The virtual sensor (e.g., implemented in the in-cylinder oxygen determiner 208) determines the in-cylinder oxygen concentration in response to one or more values related to air handling, which allows for an estimation of the oxygen concentration in the cylinder at the time of combustion. The selected values characterize the amount of oxygen entering the cylinder before intake valve closing and optionally the amount of gases already in the cylinder. Those having skill in the art, having the benefit of the disclosure herein and having a typical understanding of the particular system in view, would be able to select the appropriate values to determine the in-cylinder oxygen concentration.

In addition to the definers, determiners, commanders, and circuits, the controller 125 typically includes one or more parameters or data structures, such as values, variables, commands, and sets thereof. These parameters or data structures may be provided to, provided by, and used by any operational structures in the controller 125 (e.g., definers, determiners, commanders, or circuits). Further, some parameters or data structures are received by the controller 125 from a component external to the controller 125 or other source, which may be provided to and used by any of the operational structures. Some parameters or data structures may also be provided by the controller 125 to a component external to the controller 125 or other destination. Data structures may be provided to the controller 125 as sensor measurements, which may be physical measurements or virtual measurements. Virtual sensor measurements are determined or interpreted from sensor measurements and/or other data structures in the controller 125. In some cases, virtual sensor measurements are the output of a definer, determiner, commander, or circuit of the controller 125.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Turning now to more detail of the definers, determiners, commanders, and circuits, as well as the parameters, the combustion parameter definer 202 interprets parameters and provides them to the controller 125. Parameters of interest for combustion may include but are not limited to engine speed, engine torque, commanded fueling value (e.g., corresponding to requested torque), total fueling, in-cylinder gases, intake gases, cylinder temperature, rail pressure, and rail temperature. One or more sensors, actual or virtual, are utilized to interpret the parameters of interest, which may include but are not limited to an actual torque sensor, a revolutions per minute sensor, and a rail pressure sensor. The parameters provided may be used by another definer, determiner, commander, or circuit, or the parameters may be used by the combustion parameter definer 202 to provide a derived or calculated parameter. An example combustion parameter definer 202 interprets the engine speed 212 and the commanded fueling value 214 as inputs to the controller 125.

As shown, the example controller 125 also includes a basis variable set 210. An example basis variable set 210 includes engine speed 212, commanded fueling value 214, and an in-cylinder $[O_2]$ value 216 (e.g., an in-cylinder oxygen concentration value at intake valve closing). The example basis variable set 210 is selected to characterize closed cycle efficiency (CCE) within the engine. As utilized herein, CCE represents the efficiency of the engine system after intake valve closing and before exhaust valve opening. Further embodiments of the basis variable set 210 include a trapped charge mass value 218, an oxygen-to-fuel related value 220 (e.g., one or more of air-to-fuel ratio, charge-to-fuel ratio, and oxygen-to-fuel ratio), an in-cylinder temperature value 222 (e.g., temperature at intake valve closing), and a related cylinder temperature value 224 (e.g., one or more of intake charge temperature, cylinder wall temperature, coolant temperature, and oil temperature). These further basis variables may be selected to further characterize closed cycle efficiency (CCE) under certain engine conditions.

The present disclosure recognizes that when the intake valve of a cylinder closes, the combustion event is fixed. As such, the basis variable set for the fuel system is selected to include variables that affect the combustion event after intake valve closing. In general, the basis variable set is a minimum set of variables that is capable of predicting the majority of the combustion event characteristics in the cylinder in at least steady state and transient state operating conditions. The basis variables may also selected based on computational efficiency. For example, in-cylinder oxygen concentration may be selected instead of EGR fraction value, which may be difficult to compute under heavy transient operation. In certain cases, it may be advantageous to include other variables in the basis variable set to account for their effect on combustion in those certain cases, for example, when the engine must warm up from a cold start, including the in-cylinder temperature value 222 would be advantageous. Those having skill in the art, having the benefit of the disclosure herein and having a typical understanding of the particular system in view, would be able to select the appropriate values of a basis variable set.

In some cases, the commanded fueling value 214 is interpreted in response to input from an operator of the engine system. For example, the commanded fueling value 214 may correspond to the requested torque from the operator. In various embodiments, the commanded fueling value 214 corresponds to a combustion-relevant fueling value, which is the amount of fuel relevant to the combustion event within the cylinder after intake valve closing.

The combustion parameter definer 202 interprets a basis variable set 210 and an optional fuel controller specification set 211. The fuel controller specification set 211 corresponds to the specifications of one or more controllers in the fuel subsystem, such as fuel controller 112. The specifications may define an acceptable range of input values for the controller of the fuel system, which can be used to define one or more acceptable ranges for the reference value set 226. In response to the basis variable set 210 and optionally the fuel controller specification set 211, the fueling target determiner 204 determines a reference value set 226.

In various embodiments, to perform the functions described herein throughout, the combustion parameter definer 202 may include a rotations per minute (RPM) sensor, an accelerator, an oxygen sensor, a temperature sensor, a pressure sensor, a flow sensor, a humidity sensor, an analog to digital (ADC) converter, a processor, a non-transient computer readable storage medium, computer-readable instruction(s) stored on a non-transient computer readable storage medium, a bus, and/or wired/wireless connection hardware. In other embodiments, one or more of these may also be excluded from the combustion parameter definer 202.

Certain embodiments of the fueling target determiner 204 determine the reference value set 226 in response to a basis variable set 210 including an engine speed 212, a commanded fueling value 214, and an in-cylinder oxygen concentration value 216 as a core basis variable set. Various embodiments of the reference value set 226 include a start-of-injection (SOI) command 228 and a rail pressure value. The rail pressure value may be a rail pressure command 230 or a default rail pressure value. The reference value set 226 may also include a main command 236, which is a fueling value that corresponds to the commanded fueling value 214. An example main command 236 is the same value as the commanded fueling value 214. However, the main command 236 may be determined in response to the fuel controller specification set 211. In some cases, the main command 236 is the combustion-relevant fueling value. In other cases, main command 236 is only a portion of the combustion-relevant fueling value, and the combustion-relevant fueling value also includes one or more of the pilot command(s) 232 and post command(s) 234.

In various embodiments, to perform the functions described herein throughout, the fueling target determiner 204 may include, but is not limited to, a processor, a non-transient computer readable storage medium, computer-readable instruction(s) stored on a non-transient computer readable storage medium, a bus, and/or a wired/wireless connection hardware. In other embodiments, one or more of these may also be excluded from the fueling target determiner 204.

As used herein, a parameter's trajectory is defined as a value or a set of values representing the parameter over a selected time horizon or time trajectory. A parameter's trajectory as a value, for example, represents the accumulation over time of the parameter, and may be interpreted in response to consolidating a set of parameter values by a process, such as integration, averaging, or other known processes.

Further embodiments of the reference value set 226 include a rail pressure command 230, a pilot command(s) 232, a post command(s) 234, a fuel injection time trajectory 238 (e.g., a fuel injection amount versus time trajectory command value), and a fuel rail pressure trajectory 240 (e.g., a fuel injection pressure versus time trajectory command value). With respect to the pilot command(s) and post command(s) 232, 234, some embodiments are combustion relevant, while in other embodiments, they are not combustion relevant and may form part of an additional fueling amount. An example of a post command 234 that is an additional fueling amount is a very late post command intended to deliver fuel to an exhaust aftertreatment system instead of contributing to torque development. An example time trajectory for these parameters is on the order of milliseconds.

In some embodiments, the fueling target determiner 204 stores relationships between the basis variable set 210 and the reference value set 226 as a series of reference surfaces, each reference surface corresponding to a reference value and having one or more basis variables as inputs. The relationships are determined during calibration. An example calibration may determine the reference surfaces in response to key basis variable measurements at various operating points of the engine system. In some cases, a target may be used to calibrate the reference surfaces, such as a closed cycle efficiency (CCE) target. The target value may be a predefined target, an improved value, a minimum value, a maximum value, or an optimum value. The reference surfaces are optionally calibrated to meet the target(s) and also to meet other objectives or constraints (e.g., constraint value 225). An example reference surface is generated that provides reference value sets as outputs, or targets, to achieve CCE targets within physical and/or emissions constraints (described in detail herein elsewhere), in response to basis variable sets and optionally a particular CCE target as inputs.

With respect to the reference value set, the present disclosure recognizes that a processing subsystem 200 is often paired with a fuel system, such as fuel system 110, which accepts a particular type of inputs and range of inputs. Those having skill in the art, having the benefit of the disclosure herein and having a typical understanding of the particular system in view, would be able to select the appropriate values for the reference value set 226.

Various embodiments of the fuel control commander 206 determine a fueling command set 252 in response to the reference value set 226. The reference value set 226 provides targets for the fuel control commander 206. In some cases, the fueling command set 252 provides the same values as the reference value set 226. In other cases, the fuel control commander 206 modifies the reference value set 430 before providing the fueling command set 252. The example fuel control commander 206 optionally modifies the reference value set 226 in response to one or more constraint values 225, including but not limited to one or more of a physical limit (e.g., maximum torque, maximum rail pressure, etc), a fuel system response time, an actuator saturation, a present fault value, and/or other known constraints.

In various embodiments, to perform the functions described herein throughout, the fuel control commander 206 may include, but is not limited to, a fuel injector, a fuel rail pressure pump, a processor, a non-transient computer readable storage medium, computer-readable instruction(s) stored on a non-transient computer readable storage medium, a bus, and/or wired/wireless connection hardware. In other embodiments, one or more of these may also be excluded from the fuel control commander 206.

In additional or alternative embodiments, the fuel control commander 206 comprises a fuel control circuit. To perform the functions described herein throughout, an example fuel control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the fuel control circuit.

The present disclosure recognizes that a particular fuel system may include a physical fuel controller calibrated to control at least one physical component of the fuel system and that various fuel systems respond uniquely to commands due to design differences and manufacturing tolerances. Thus, an example fuel control commander 206 optionally adjusts to the reference value set 226 in response to limitations or constraints of the fuel system 110. Those having skill in the art, having the benefit of the disclosure herein and having a typical understanding of the particular system in view, would be able to select the appropriate fueling command set 252 for a fuel system 110.

One of skill in the art, having the benefit of the disclosures herein, will recognize that the processing subsystem 200 and the controller 125 perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, aftertreatment systems therefore, air handling devices therefore, and intake and exhaust devices therefore.

The schematic flow diagram and related description which follows provides an illustrative embodiment of performing procedures for controlling the condition of an exhaust gas stream. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 3:
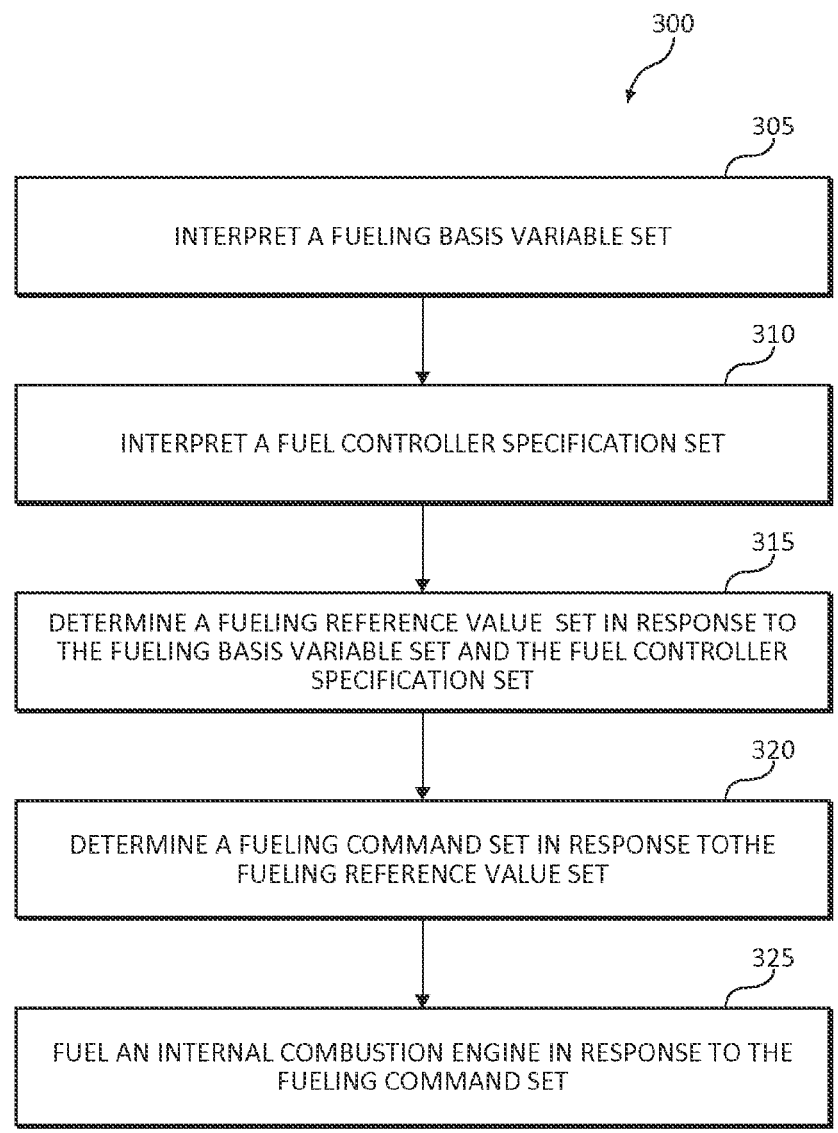
FIG. 3 is a schematic flow diagram of an example procedure for controlling the fuel subsystem of FIG. 1, according to some embodiments.

FIG. 3 is a schematic flow chart diagram of an example procedure 300 for controlling the fuel system 110 of the engine system 100, according to some embodiments. The procedure includes an operation 305 to interpret a fueling basis variable set. The fueling basis variable set is selected to characterize the majority of effects of the fuel subsystem. In operation 310, a fuel controller specification set is interpreted. An example fuel controller specification set defines the acceptable types of inputs and their range for a controller of the fuel subsystem.

In operation 315, a fueling reference value set is determined in response to the fueling basis variable set and the fuel controller specification set. The fueling reference value set is a set of target values for performance of the fuel subsystem. By including the fuel controller specification set, the target values may be determined within acceptable ranges of the specification of one or more controllers of the fuel subsystem to facilitate more accurate control of the fuel subsystem. In some embodiments, the fuel controller specification set is included in the calibration of the fueling reference value set in response to the fueling basis variable set.

In operation 320, a fueling command set is determined in response to the fueling reference value set. The fueling command set may be the same as fueling reference value set. Alternatively or in combination, the fueling reference value set may be modified to provide a fueling command set. For example, the fueling command set is optionally determined further in response to constraints (or limitations) of the fuel subsystem. In some embodiments, one or more constraints (e.g., physical, emissions, or otherwise) of the fuel subsystem are included in calibration of the fueling reference value set in response to the fueling basis variable set. In such embodiments, the fueling reference value set is optionally not modified in response to those constraints at run-time.

Finally, in operation 325 an internal combustion engine is fueled in response to the fueling command set. The fueling step may include providing the fueling command set to a controller of the fuel subsystem. The controller of the fuel system may operate components of the fuel system, such as one or more injectors or fuel rails, to provide fuel to the internal combustion engine.

Other components of the system 100 may be controlled in a similar manner, using basis variables, reference values, and commands.

Figure 4:
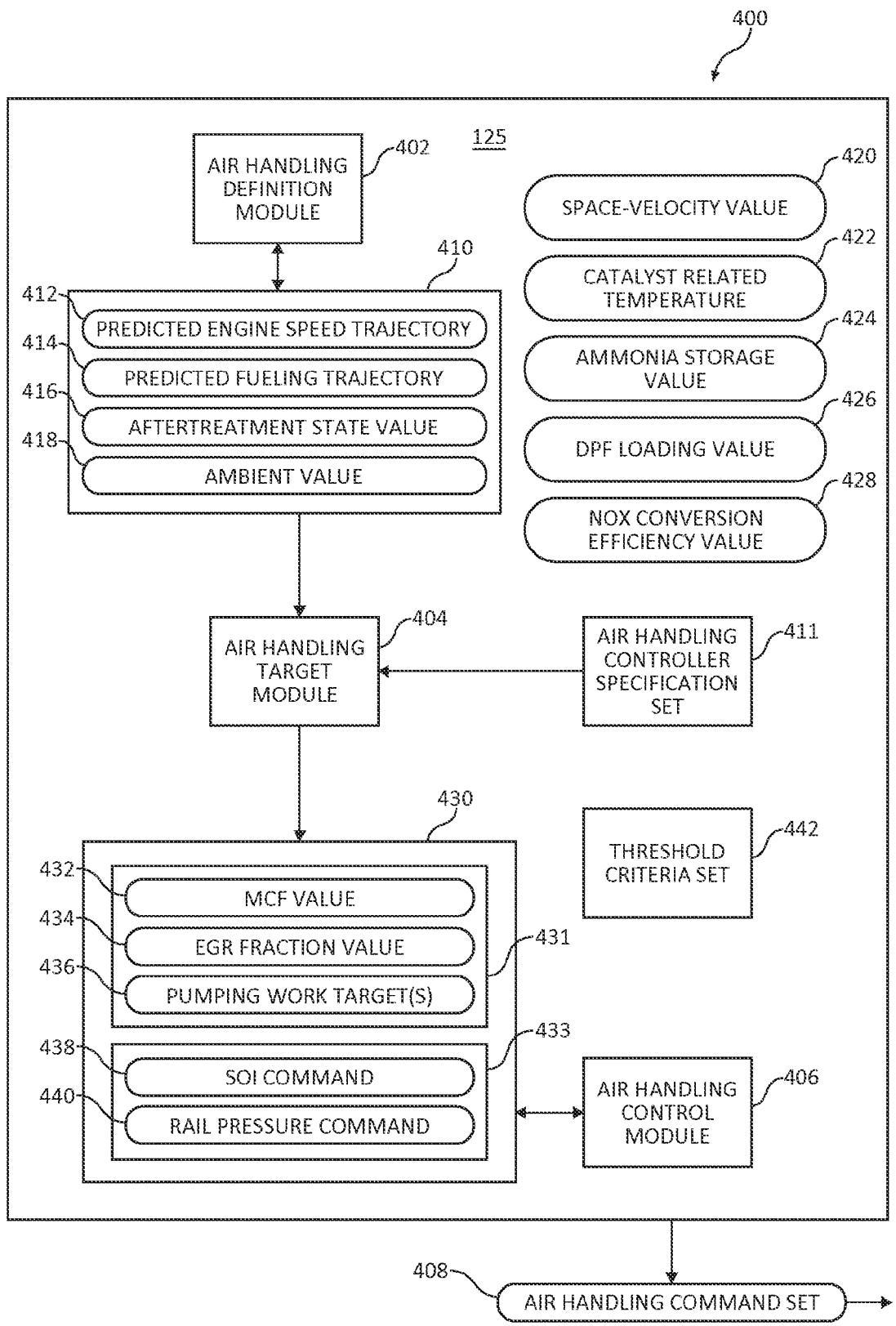
FIG. 4 is a schematic illustration of a processing subsystem of the engine system of FIG. 1 including a controller to perform certain operations to control the air handling system, according to some embodiments.

FIG. 4 is a schematic illustration of a processing subsystem 400 of the engine system 100 including a controller 125 to perform certain operations to control the air handling system 115, according to some embodiments. As shown, the controller 125 includes an air handling parameter definer 402, an air handling target determiner 404, and an air handling control commander 406 (e.g., air handling control circuit). The air handling parameter definer 402 interprets one or more basis variables for air handling. An example basis variable set characterizes open cycle efficiency (OCE), which considers the work of the air handling system to provide air, which may be compressed, or recirculated exhaust to the cylinder. The air handling target determiner 404 determines an air handling reference value set in response to a key basis variable set for air handling. An example air handling reference value set corresponds to target values for the air handling system. Some target values are conformed to the specification set of one or more physical controllers of the air handling system, such as air handling controller 117. The air handling control commander 406 provides one or more air handling command values in response to a reference value set for air handling. An example command value set modifies the reference value set due to being calibrated to match the air handling system or due to other limits. Further, the air handling system may deliver air to the internal combustion engine in response to the reference value set upon receiving the one or more air handling command values.

Similar to the combustion parameter definer 202, the air handling parameter definer 402 interprets parameters to characterize the air handling system and provides these parameters to the controller 125. Parameters of interest may include but are not limited to charge flow, exhaust oxygen, humidity (e.g., water vapor displacement), intake oxygen, exhaust manifold temperature/pressure, and intake manifold temperature/pressure. An example air handling parameter definer 402 interprets a predicted engine speed trajectory 412 and a predicted fueling trajectory 414. An example response time for these parameters is on the order of seconds. A trajectory may be an expected or actual value over a few time steps or a few seconds. Time steps reference execution time steps, such as controller execution time steps, for example, 5 ms, 20 ms, or other values known to one having skill in the art having the benefit of the disclosure herein. Example engine speed trajectories 412 may extend from 100 ms to 10 s, or in some cases beyond 10 s depending on the transient operations at the time and the parameters to be optimized. Example fueling trajectories 414 may extend from 10 ms to 1 s, or in some cases up to 5 s or beyond depending on the transient operations at the time and the parameters to be optimized.

The example air handling parameter definer 402 is in operative communication with one or more sensors. The air handling parameters are handling parameter definer 402 are interpreted in response to signals, data, or information received from the one or more sensors. A non-limiting list of example sensors include an intake manifold pressure sensor, an intake manifold temperature sensor, an EGR flow sensor (e.g., orifice with delta-P sensor), an absolute pressure sensor, a temperature sensor, a wideband exhaust gas oxygen sensor, a humidity sensor, an intake oxygen sensor, and an exhaust gas temperature sensor. A person having skill in the art and the benefit of the disclosure herein would be able to select the one or more sensors for characterizing a parameter of interest for the air handling system. In some embodiments, the one or more sensors are part of the air handling parameter definer 402.

The example controller 125 shown includes a basis variable set 410. The basis variable set may include one or more of a predicted engine speed trajectory 412, a predicted fueling trajectory 414, an aftertreatment state value 416, and an ambient value 418. Aftertreatment state values 416 include, without limitation, the temperature of any aftertreatment component, the flow rate through any aftertreatment component, the predicted efficiency of any aftertreatment component, and/or the pressure drop of any aftertreatment component. Ambient values 418 include, without limitation, the ambient temperature, the ambient pressure, the ambient humidity, and/or the ambient heat transfer around any aftertreatment component.

An example basis variable set 410 includes the predicted engine speed trajectory 412, the predicted fueling trajectory 414, and the ambient value 418. The example basis variable set 410 is selected to characterize open cycle efficiency (OCE) within the engine system. As utilized herein, OCE represents the efficiency of the engine system to bring air into a cylinder before intake valve closing. Example aftertreatment state values, which may also affect OCE, include one or more of a space-velocity value 420, a catalyst related temperature 422 (e.g., measured directly or indirectly), an ammonia ($NH_3$) storage value 424 (e.g., ammonia storage in an SCR catalyst), a diesel particulate filter (DPF) loading value 426, and a $NO_X$ conversion efficiency value 428 (e.g., SCR catalyst conversion efficiency or $DeNO_X$).

The present disclosure recognizes that the overall efficiency of the engine system is affected by the efficiency of the air handling system in bringing air into a cylinder before intake valve closing. The key basis variables for air handling is the minimum set of variables that is capable of predicting the majority of the air handling characteristics in at least steady state and transient state operation conditions. The key basis variables for air handling may further be selected based on computational efficiency. Those having skill in the art, having the benefit of the disclosure herein and having a typical understanding of the particular system in view, would be able to select the appropriate values of a basis variable set.

In various embodiments, to perform the functions described herein throughout, the air handling parameter definer 402 may include, but is not limited to, a rotations per minute (RPM) sensor, a fuel injector, an accelerator, a temperature sensor, a pressure sensor (e.g., absolute or differential), a humidity sensor, a $NO_X$ sensor, an ammonia sensor, a flow sensor, an analog to digital (ADC) converter, a processor, a non-transient computer readable storage medium, computer-readable instruction(s) stored on a non-transient computer readable storage medium, a bus, and/or wired/wireless connection hardware. In other embodiments, one or more of these may be excluded from the air handling parameter definer 402.

The air handling target determiner 404 interprets the basis variable set 410 and an optional air handling controller specification set 411. The air handling controller specification set 411 corresponds to the specifications of one or more controllers in the air handling system 115, such as air handling controller 117. The specifications may define an acceptable range of input values for the controller of the air handling system, which can be used to define one or more acceptable ranges for the reference value set 430. In response to the basis variable set 410 and optionally the air handling controller specification set 411, the air handling target determiner 404 determines the reference value set 430. Further embodiments of the air handling target determiner 404 determine the reference value set 430 further in response a threshold criteria set 442, which may include objectives or constraints for the reference value set. In some embodiments, the threshold criteria set 442 is included during calibration to establish relationships between the reference value set 430 and the basis variable set 410.

In various embodiments, the air handling target determiner 404 may include a processor, a non-transient computer readable storage medium, computer-readable instruction(s) stored on a non-transient computer readable storage medium, a bus, and/or wired/wireless connection hardware. In other embodiments, one or more of these may be excluded from the air handling target determiner 404.

Various embodiments of the reference value set 430 include a mass charge flow (MCF) value 432. Further embodiments include an exhaust gas recirculation (EGR) fraction value 434. Alternatively or in addition, some embodiments include pumping work target(s) 436. The MCF value 432, EGR fraction value 434, and pumping work target(s) 436 may be considered part of an air handling reference subset 431 of the reference value set 430. In yet further embodiments, the reference value set 430 includes at least one of a start-of-injection (SOI) command 438 and a rail pressure command 440 as a fueling reference subset 433 of the reference value set 430. Referring to FIG. 2, a fueling command may include a pilot command(s) 232 and/or a post command(s) 234 in addition to a main command 236.

The present disclosure recognizes that a processing subsystem 400 is often paired with an air handling system, such as air handling system 115, which accepts a particular type of input and range of inputs. The processing subsystem 400 may further be in operative communication with a fuel system 110, in order to coordinate and optimize, for example, brake thermal efficiency (BTE) of the engine system 100. Those having skill in the art, having the benefit of the disclosure herein and having a typical understanding of the particular system in view, would be able to select the appropriate values for the reference value set 430, the air handling reference subset 431, and the fueling reference subset 433.

In some embodiments, the air handling target determiner 404 stores relationships between the basis variable set 410 and the reference value set 430 as a series of reference surfaces, each reference surface corresponding to a reference value and having one or more basis variables as inputs. The relationships may be determined during calibration. An example calibration determines the reference surfaces in response to key basis variable measurements at various operating points of the engine system. In some cases, a target may be used to calibrate the reference surfaces, such as an open cycle efficiency (OCE) target. The target value may be a predefined target, an improved value, a minimum value, a maximum value, or an optimum value. The reference surfaces are optionally calibrated to meet the target(s) and also to meet other objectives or constraints (e.g., selected from the threshold criteria set 442). An example reference surface is generated that provides reference value sets as outputs, or targets, to achieve OCE targets within physical and/or emissions constraints, in response to basis variable sets and optionally a particular OCE target as inputs.

Certain embodiments of the air handling control commander 406 determine an air handling command set 408 in response to the reference value set 430. The reference value set 430 provides targets for the air handling control commander 406. In some cases, the air handling control commander 406 provides the reference value set 430 as the air handling command set 408. In other cases, the air handling control commander 406 modifies the reference value set 430 before providing the air handling command set 408. In further cases, the air handling control commander 406 modifies the reference value set 430 in response to a constraint (described herein elsewhere in more detail).

In various embodiments, to perform the functions described herein throughout, the air handling control commander 406 may include, but is not limited to, an EGR valve, a VGT, an engine fan, a fuel injector, a fuel rail pressure pump, a processor, a non-transient computer readable storage medium, computer-readable instruction(s) stored on a non-transient computer readable storage medium, a bus, and/or wired/wireless connection hardware. In other embodiments, one or more of these may be excluded from the air handling control commander 406.

In additional or alternative embodiments, the air handling control commander 406 comprises an air handling control circuit. To perform the functions described herein throughout, an example air handling control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the air handling control circuit.

The present disclosure recognizes that a particular air handling system may include one or more physical air handling controllers calibrated to control at least one physical component of the air handling system and that various air handling systems respond uniquely to commands due to design differences and manufacturing tolerances. Thus, an example air handling control commander 406 provides adjustments to the reference value set 430 in response to limitations or constraints of the air handling system 115. Those having skill in the art, having the benefit of the disclosure herein and having a typical understanding of the particular system in view, would be able to select the appropriate air handling command set 408 for an air handling system 115. In this manner, the air handling system 115 may be controlled utilizing a key basis variable set 410, a reference value set 430, and a command set 408.

Figure 5:
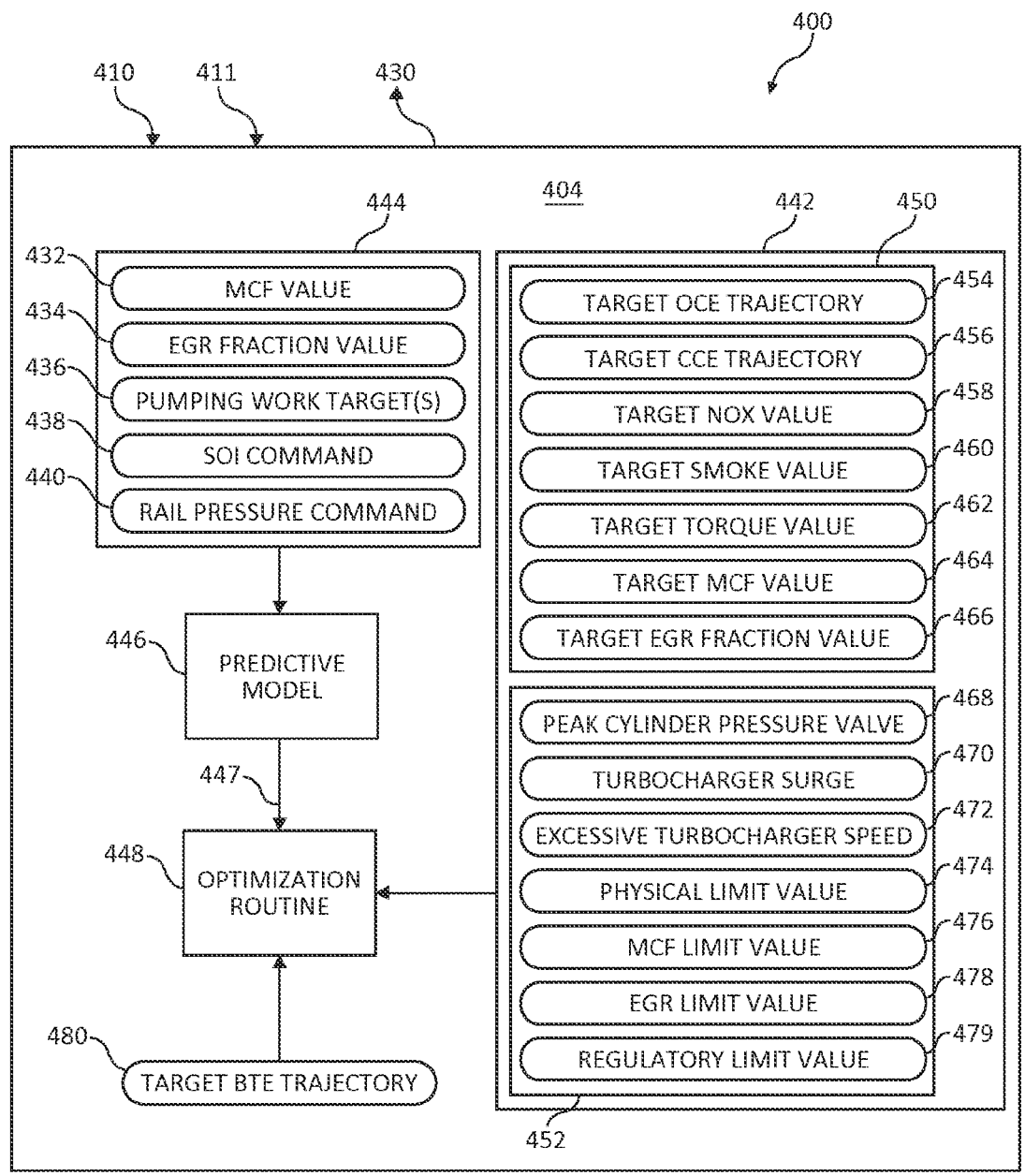
FIG. 5 is a schematic illustration of the air handling target determiner of the processing subsystem of FIG. 4, according to some embodiments.

FIG. 5 is a schematic illustration of the air handling target determiner 404 of processing subsystem 400, according to some embodiments. An example air handling target determiner 404 includes a predictive model 446 and an optimization routine 448, which are optionally utilized to provide the reference value set 430 in response to the basis variable set 410 and the air handling controller specification set 411.

An example air handling target determiner 404 determines a design reference value set 444 in response to the basis variable set 410 and optionally the air handling controller specification set 411. The design reference value set 444 may be determined similarly to, may include similar values to, and may be selected similarly as described with respect to the reference value set 430. Thus, the design reference value set 444 includes at least one of an MCF value 432, an EGR fraction value 434, pumping work target(s) 436, an SOI command 438, and a rail pressure command 440. These one or more design reference values serve as initial target values that may be modified in iteratively in a cycle until certain conditions are met prompting the reference value set 430 to be provided. In various embodiments, initial design reference value set 444 is a steady state reference value set. In some cases, the steady state reference value set is provided as an initial guess or estimate for the design reference value set 444. In other cases, the design reference value set 444 as the steady state reference value set is provided as the reference value set 430 in response to a steady state operating condition (e.g., the air handling target determiner 404 acts as a unity gain filter).

With initial target values available, an output set 447 of the predictive model 446 is determined as a step in an iteration. An example output set 447 includes at least one of a predicted open cycle efficiency (OCE) trajectory, a predicted closed cycle efficiency (CCE) trajectory, a predicted $NO_X$ value, a predicted smoke value, a predicted torque value, a predicted mass charge flow (MCF) value, and a predicted exhaust gas recirculation (EGR) fraction value, a predicted cylinder pressure value, a predicted turbocharger surge, a predicted turbocharger speed, and a predicted physical value. The output set 447 may be determined in response to the design reference value set 444 and one or more basis variables of the basis variable set 410. In certain embodiments, the predictive model is a control-oriented model (COM) of the air handling subsystem that is run over a time trajectory. The reference value set 430 may be further determined in response to the output set 447.

In response to the output set 447, an example embodiment of the air handling target determiner 404 further checks for traversal of a feasible trajectory of the air handling system 115. Alternatively or in addition, in response to the output set 447, an example embodiment of the air handling target determiner 404 also checks for a hardware limit violation. Examples of hardware limit violations are turbocharger surge 470 or excessive turbocharger speed 472. The reference value set 430 may be determined in response to either or both of these checks.

Various embodiments of an optimization routine 448 determine when to provide the reference value set 430. An example optimization routine 448 operates to provide the reference value set in response to an output condition to end a cycle of iterations, such as achieving a target BTE trajectory 480, reaching a predetermined time limit, or meeting some other condition.

Until the output condition is met, the air handling target determiner 404 may constrain the design reference value set 444 in response to at least one of the target BTE trajectory 480 and the threshold criteria set 442. For example, the cycle of iterations continues with a next iteration. An example optimization routine 448 continues to determine a next design variable set 444 with which to begin a next iteration in response to the predictive model output set 447 and optionally the threshold criteria set 442.

An example target BTE trajectory 480 is an optimum or maximum BTE trajectory over a chosen time horizon. Some embodiments of the target BTE trajectory 480 are calculated as the product of a target OCE trajectory 454 and a target CCE trajectory 456. Often, optimizing the target BTE trajectory 480 requires balancing CCE and OCE to achieve a local or global optimum. For example, a greater CCE may be achieved with greater amounts of compressed air in the cylinder, which requires more work from the air handling system and a lesser OCE. Though a global optimum could produce the highest efficiency, a local optimum can be preferred over a global optimum, for example, when time constraints do not allow for the processing time required to find the global optimum. Non-limiting examples of local optimums include local minimums or maximums of a predictive operation (e.g. by derivative), local minimums or maximums of an error-calculating operation, and a result from a tree search (e.g. Monte Carlo). The optimization routine 448 may determine the reference value set 430 or the design reference value set 444 further in response to the target BTE trajectory 480.

In various embodiments, the optimization routine 448 constrains the reference value set 430 or the design reference value set 444 further in response to the threshold criteria set 450, for example, so that the engine system 100 operates to achieve one or more objective values 450 optionally within the limits of one or more constraint values 452. In some embodiments, the values selected for the output set 447 correspond to the values selected for the threshold criteria set 442. The output set 447 may be compared to the threshold criteria set 442. The reference value set 430 may be further constrained in response to the comparison.

Various embodiments of the threshold criteria set 442 include at least one of an objective value subset 450 and a constraint value subset 452. The objective value subset 450 provides objectives or targets for performance, whereas the constraint value set 452 provides constraints that are physical (e.g., hardware based), regulatory (e.g., related to emission limit), feasible in the state space, or otherwise selected. An example objective value subset 450 includes at least one of a target open cycle efficiency (OCE) trajectory 454, a target closed cycle efficiency (CCE) trajectory 456, a target $NO_X$ value 458, a target smoke value 460, a target torque value 462, a target mass charge flow (MCF) value 464, and a target exhaust gas recirculation (EGR) fraction value 466. An example constraint value subset 452 includes one or more a peak cylinder pressure value 468, a turbocharger surge 470, an excessive turbocharger speed 472, a physical limit value 474, a mass charge flow (MCF) limit value 476, an exhaust gas recirculation (EGR) limit value 478, and a regulatory limit value 479 (e.g., related to an emission limit).

To summarize, an initial design reference value set is determined in response to the basis variable set and optionally the air handling controller specification set. The initial design reference value set may be a best guess, such as a steady state reference value set. This set is provided to a predictive model, which provides an output set. An optimization routine optionally constrains the set in response to a threshold criteria set and the output set of the predictive model. The set may be provided as a design reference value set for another iteration in the cycle or may be provided as a reference value set when an output condition is met. In this way, the air handling target determiner 404 is capable of generating an iteratively optimized and/or improved reference value set 430.

Figure 6:
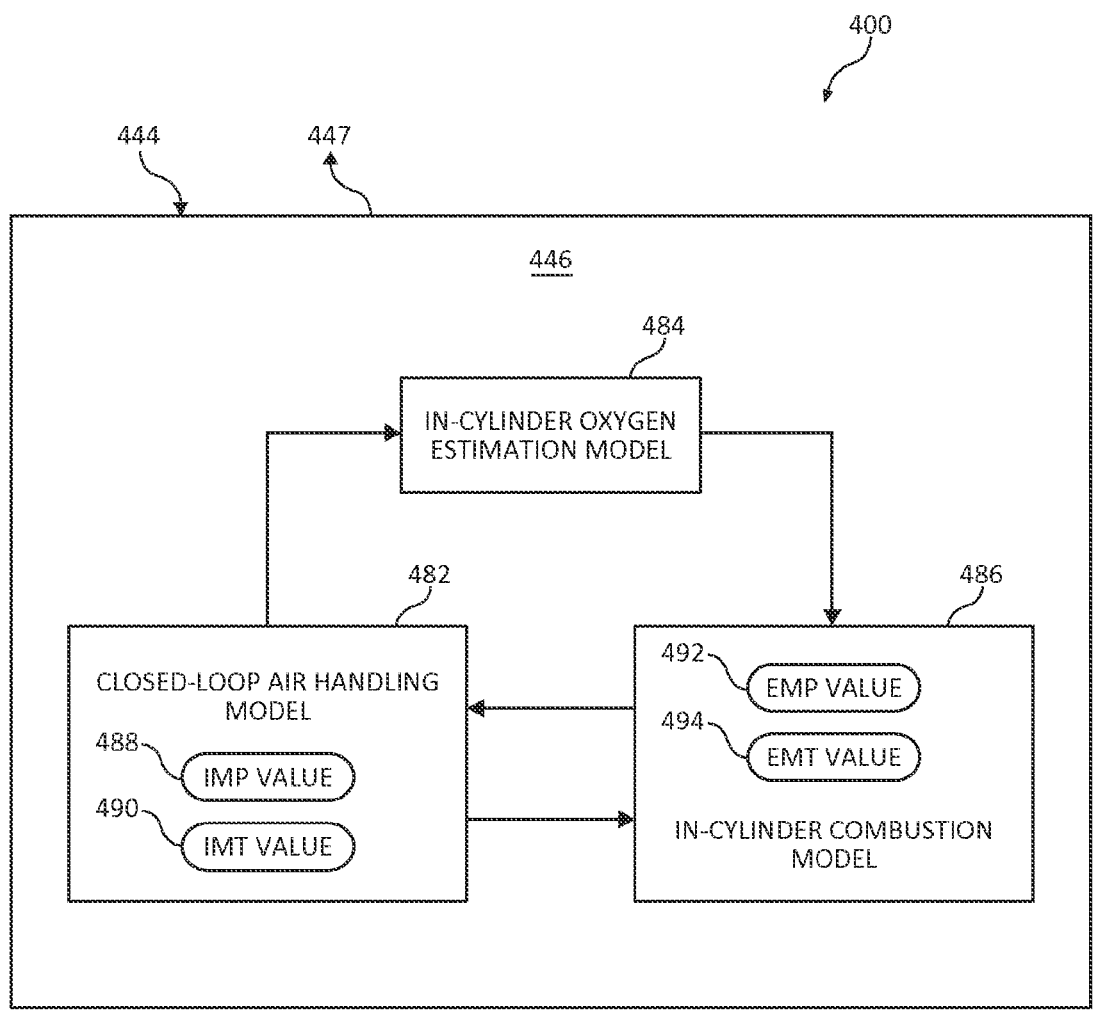
FIG. 6 is a schematic illustration of an example predictive model of the air handling target determiner of FIG. 5, according to some embodiments.

FIG. 6 is a schematic illustration of an example predictive model 446 of the processing subsystem 400, according to some embodiments. The predictive model 446 includes one or more submodels to provide the output set 447 in response to the design reference value set 444. An example predictive model 446 includes a closed-loop air handling model 482, an in-cylinder oxygen estimation model 484, and an in-cylinder combustion model 486. The models may work cooperatively to provide the output set 447. In some cases, the output set 447 is updated in response to the submodels 482, 484, 486. For example, the last in-cylinder combustion information may be used to estimate the amount of air being recirculated for the next combustion. The amount of air being provided at intake and being recirculated may be used to estimate in-cylinder oxygen. The in-cylinder oxygen estimation may be used to estimate the next in-cylinder combustion characteristics. In this way, the predictive model 446 provides an output set 447 that may be compared to the threshold criteria set 442.

An example closed-loop air handling model 482 determines an intake manifold pressure value 488 and an intake manifold temperature value 490. An example in-cylinder combustion model 486 determines an exhaust manifold pressure value 492 and an exhaust manifold temperature value 494. The in-cylinder oxygen estimation model 484 determines the amount or concentration of oxygen provided into the cylinder.

Figure 7:
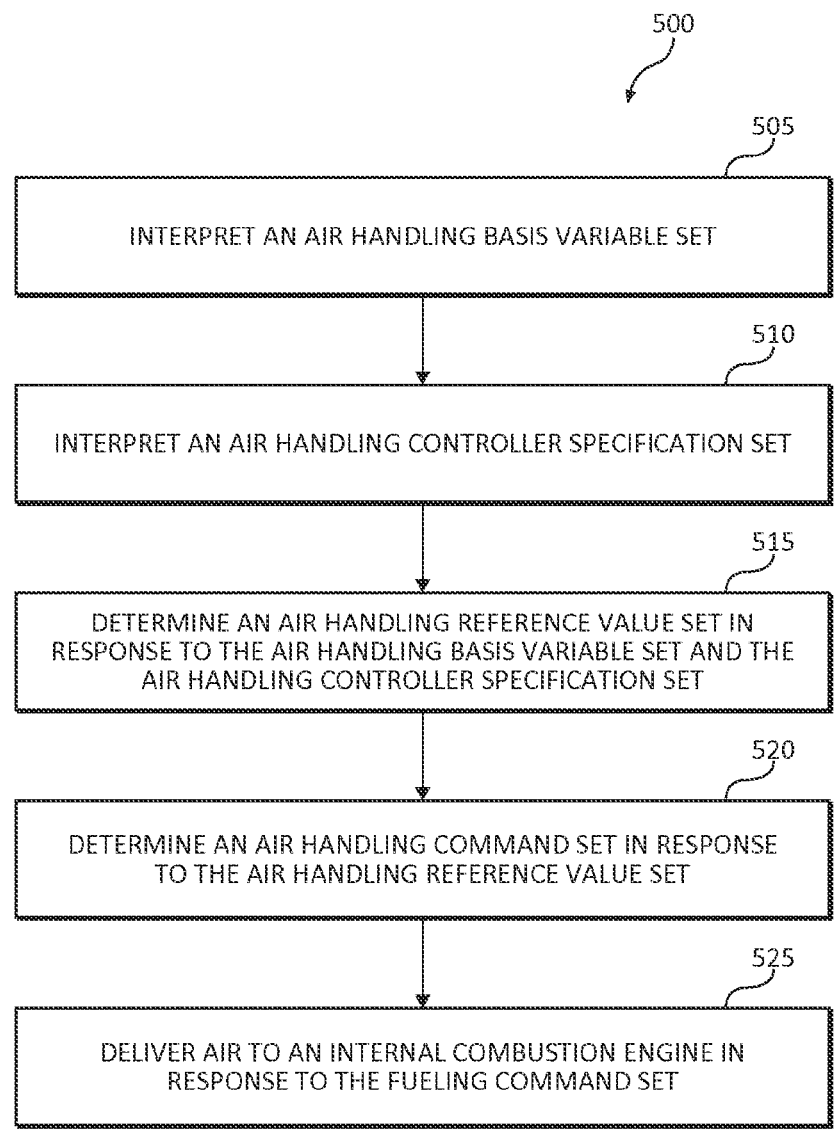
FIG. 7 is a schematic flow chart diagram of an example procedure for controlling the air handling system of FIG. 1, according to some embodiments.

FIG. 7 is a schematic flow chart diagram of an example procedure 500 for controlling the air handling system 115 of the engine system 100, according to some embodiments. The procedure includes an operation 505 to interpret an air handling variable set. The air handling basis variable set is selected to characterize the majority of effects of the air handling subsystem. In operation 510, an air handling specification set is interpreted. An example air handling specification set defines the acceptable types of inputs and their range for a controller of the air handling subsystem.

In operation 515, an air handling reference value set is determined in response to the air handling basis variable set and the air handling controller specification set. The air handling reference value set is a set of target values for performance of the air handling subsystem. By including the air handling controller specification set, the target values may be determined within acceptable ranges of the specification of one or more controllers of the air handling subsystem to facilitate more accurate control of the air handling subsystem. Operation 515 may include updating one or more predictive models and/or constraining an air handling reference value set to meet various threshold criteria. In some embodiments, the air handling controller specification set is included in the calibration of the air handling reference value set in response to the air handling basis variable set.

In operation 520, an air handling command set is determined in response to the air handling reference value set. The air handling command set may be the same as air handling reference value set. Alternatively or in combination, the air handling reference value set may be modified to provide an air handling command set. For example, the air handling command set may be determined to take into account constraints (or limitations) of the air handling subsystem. In some embodiments, one or more constraints (e.g., physical, emissions, or otherwise) of the air handling subsystem are included in calibration of the air handling reference value set in response to the air handling basis variable set. In such embodiments, the fueling reference value set is optionally not modified in response to those constraints at run-time.

Finally, in operation 525, air is delivered to an internal combustion engine in response to the air handling command step. The delivering step may include providing the air handling command set to a controller of the air handling subsystem. The controller of the air handling system may operate components of the air handling system, such as one or more turbochargers and EGR valves, to deliver air to the internal combustion engine.

Figure 8:
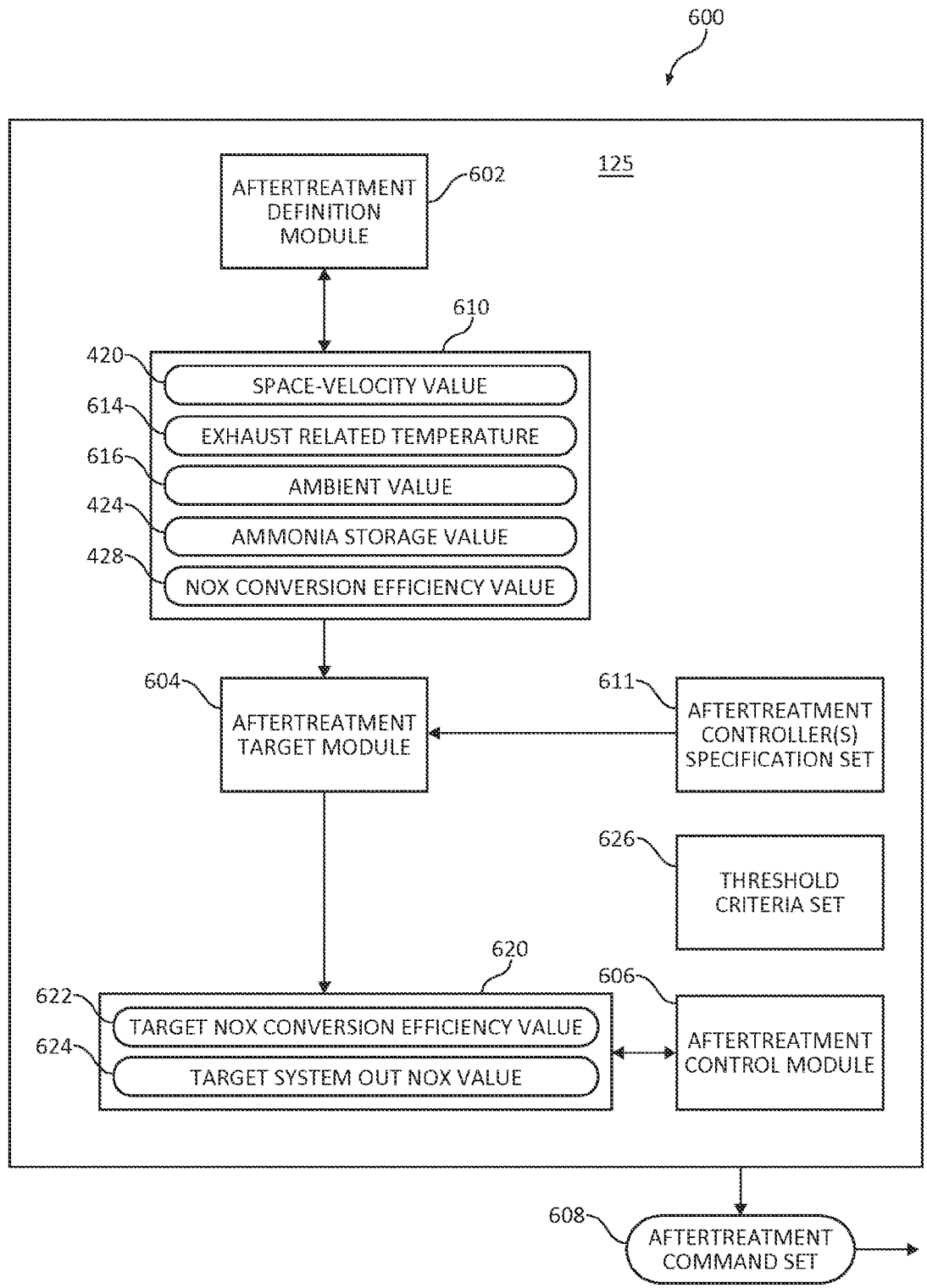
FIG. 8 is a schematic illustration of a processing subsystem of the engine system of FIG. 1 including a controller to perform certain operations to control the aftertreatment system, according to some embodiments.

FIG. 8 is a schematic illustration of a processing subsystem 600 of the engine system 100 including a controller 125 to perform certain operations to control the aftertreatment system 120, according to some embodiments. As shown, the controller 125 includes an aftertreatment parameter definer 602, an aftertreatment target determiner 604, and an aftertreatment control commander 606 (e.g., aftertreatment control circuit). The aftertreatment parameter definer 602 interprets one or more basis variables for aftertreatment. An example basis variable set characterizes a moving average of emission in a receding time horizon. The aftertreatment target determiner 604 determines an aftertreatment reference value set in response to a key basis variable set for aftertreatment. An example aftertreatment reference value set corresponds to target values for the aftertreatment system. Some target values are conformed to the specification set of one or more physical controllers of the aftertreatment system, such as aftertreatment controller 124. The aftertreatment control commander 606 provides one or more aftertreatment command values in response to a reference value set for aftertreatment. An example command value set modifies the reference value set due to being calibrated to match the aftertreatment system or due to other limits. Further, the aftertreatment system 120 may treat the exhaust from the internal combustion engine in response to the reference value set upon receiving the one or more aftertreatment command values.

The aftertreatment parameter definer 602 interprets parameters and provides them to the controller 125. An example aftertreatment parameter definer 602 interprets one or more of a space-velocity value 420, an exhaust related temperature 614 (e.g., an exhaust temperature, a catalyst temperature, DPF temperature, EGR temperature, etc), an ambient value 616, an ammonia storage value 424, and an $NO_X$ conversion efficiency value 428.

The example controller 125 shown includes a basis variable set 610. The basis variable set includes one or more parameters interpreted by the aftertreatment parameter definer 602, such as the space-velocity value 420, the exhaust related temperature 614, the ambient value 616, the ammonia storage value 424, and the $NO_X$ conversion efficiency value 428. An example basis variable set includes the space-velocity value 612, the exhaust related temperature 614, and the ambient value 616. The example basis variable set 610 is selected to characterize an emissions trajectory within the engine system, such as a system out $NO_X$ trajectory (e.g., $NO_X$ at the tailpipe over time). An example time trajectory is on the order of hours.

The present disclosure recognizes that the moving average of emissions in a receding time horizon may be used to regulate the cumulative emissions of engine system 100. A cumulative emissions threshold may be selected in response to, for example, a regulatory value, an offset of the regulatory value (e.g., below the regulatory value or above the regulatory value) for emission credit use or provision, an emission credit trading value, or a sociability requirement. An emission credit trading value may be determined in response to, for example, run-time credits (e.g., in response to real-time emission credit trading) or design-time credits (e.g., in response to a predetermined allocation of emission credits for a particular engine). Typical cumulative emissions include, without limitation, accumulated $NO_X$ and/or particulate matter. Example particulate matter includes unburned hydrocarbons and/or soot. The key basis variables for aftertreatment is the minimum set of variables that is capable of predicting the majority of the aftertreatment characteristics in at least steady state and transient state operation conditions. The key basis variables for aftertreatment may further be selected based on computational efficiency. Those having skill in the art, having the benefit of the disclosure herein and having a typical understanding of the particular system in view, would be able to select the appropriate values of a basis variable set.

In various embodiments, to perform the functions described herein throughout, the aftertreatment parameter definer 602 may include, but is not limited to, a pressure sensor (e.g., absolute or differential), a temperature sensor, a $NO_X$ sensor, an ammonia sensor, an analog to digital (ADC) converter, a processor, a non-transient computer readable storage medium, computer-readable instruction(s) stored on a non-transient computer readable storage medium, a bus, and/or wired/wireless connection hardware. In other embodiments, one or more of these may be excluded from the aftertreatment parameter definer 602.

The aftertreatment target determiner 604 interprets the basis variable set 610 and optionally the aftertreatment controller specification set 611. The aftertreatment controller specification set 611 corresponds to the specifications of one or more controllers in the aftertreatment system 120, such as aftertreatment controller 124. The specifications may define an acceptable range of input values for the controller of the aftertreatment system, which can be used to define one or more acceptable ranges for the reference value set 620. In response to the basis variable set 610 and optionally the aftertreatment controller specification set 611, the aftertreatment target determiner 604 determines the reference value set 430. Further embodiments of the aftertreatment target determiner 604 determine the reference value set 620 further in response a threshold criteria set 626, which may include objectives or constraints (e.g., physical, emissions, or otherwise) for the reference value set. In some embodiments, the threshold criteria set 626 is included during calibration to establish relationships between the reference value set 620 and the basis variable set 610.

Various embodiments of the reference value set 620 include at least one of a target $NO_X$ conversion efficiency value 622 (e.g., target $NO_X$ conversion efficiency of the SCR catalyst) and a target system out $NO_X$ value 624 (e.g., target $NO_X$ at the tailpipe). One of skill in the art would understand that the target $NO_X$ conversion efficiency value 622 is an emergent value, and contemplating a particular system and having the benefit of the disclosures herein would understand the values of exhaust temperature, catalyst temperature, exhaust flow rate, catalyst loading, ammonia to $NO_X$ ratio, and/or other similar parameters to achieve a particular target $NO_X$ conversion efficiency value 622. The present disclosure recognizes that a processing subsystem 600 is often paired with an aftertreatment system, such as aftertreatment system 120, which accepts a particular type of input and range of inputs. Further, the present disclosure recognizes that the target $NO_X$ conversion efficiency value 622 and the target system out $NO_X$ value 624 are capable of defining the parameters to control a majority of effects in the aftertreatment system 120. Those having skill in the art, having the benefit of the disclosure herein and having a typical understanding of the particular system in view, would be able to select the appropriate values for the reference value set 620.

In some embodiments, the aftertreatment target determiner 604 stores relationships between the basis variable set 610 and the reference value set 620 as a series of reference surfaces, each reference surface corresponding to a reference value and having one or more basis variables as inputs. The relationships may be determined during calibration. An example calibration determines the reference surfaces in response to key basis variable measurements at various operating points of the engine system. In some cases, a target is optionally used to calibrate the reference surfaces, such as an engine brake specific fuel consumption (EBSFC) trajectory, a number of DPF regenerations, and/or an aggregate emissions trajectory. The target value may be a predefined target, an improved value, a minimum value, a maximum value, or an optimum value. In some embodiments, the target includes a minimum EBSFC trajectory. In additional or alternative embodiments, the target includes a minimum number of DPF regenerations over a time trajectory. An example reference surface is generated that provides reference value sets as outputs, or targets, to achieve EBSFC targets within physical and/or emissions constraints, in response to basis variable sets and optionally a particular OCE target as inputs.

In various embodiments, to perform the functions described herein throughout, the aftertreatment target determiner 604 may include, but is not limited to, a processor, a non-transient computer readable storage medium, computer-readable instruction(s) stored on a non-transient computer readable storage medium, a bus, and/or wired/wireless connection hardware. In other embodiments, one or more of these may be excluded from the aftertreatment target determiner 604.

Certain embodiments of the aftertreatment control commander 606 determine an aftertreatment command set 608 in response to the reference value set 620. The reference value set 620 provides targets for the aftertreatment control commander 606. In some cases, the aftertreatment control commander 606 provides the reference value set 620 as the aftertreatment command set 608. In other cases, the aftertreatment control commander 606 modifies the reference value set 620 before providing the aftertreatment command set 608. In further cases, the aftertreatment control commander 606 modifies the reference value set 620 in response to a constraint, such as a physical limit or regulatory limit (e.g., selected from threshold criteria set 626).

In various embodiments, to perform the functions described herein throughout, the aftertreatment control commander 606 may include, but is not limited to, a diesel exhaust fluid (DEF) valve, an ammonia fluid valve, a fuel injector, an EGR valve, a VGT, a processor, a non-transient computer readable storage medium, computer-readable instruction(s) stored on a non-transient computer readable storage medium, a bus, and/or wired/wireless connection hardware. In other embodiments, one or more of these may be excluded from the aftertreatment control commander 606.

In additional or alternative embodiments, the aftertreatment control commander 606 comprises an aftertreatment control circuit. To perform the functions described herein throughout, an example aftertreatment control circuit may include, but is not limited to, an analog circuit, a digital circuit, an analog-to-digital converter (ADC) or vice versa, a processor, a non-transient computer readable storage medium, computer-readable instruction(s) stored on a non-transient computer readable storage medium, a bus, and/or wired/wireless connection hardware. In other embodiments, one or more of these may also be excluded from the aftertreatment control circuit.

The present disclosure recognizes that a particular aftertreatment system may include one or more physical aftertreatment controllers calibrated to control the particular physical components of the aftertreatment system and that various aftertreatment systems respond uniquely to commands due to design differences and manufacturing tolerances. Thus, an example aftertreatment control commander 606 provides adjustments to the reference value set 620 in response to limitations or constraints of the aftertreatment system 120. Those having skill in the art, having the benefit of the disclosure herein and having a typical understanding of the particular system in view, would be able to select the appropriate aftertreatment command set 608 for an aftertreatment system 120. In this manner, the aftertreatment system 120 may be controlled utilizing a key basis variable set 610, a reference value set 620, and/or a command set 608.

Figure 9:
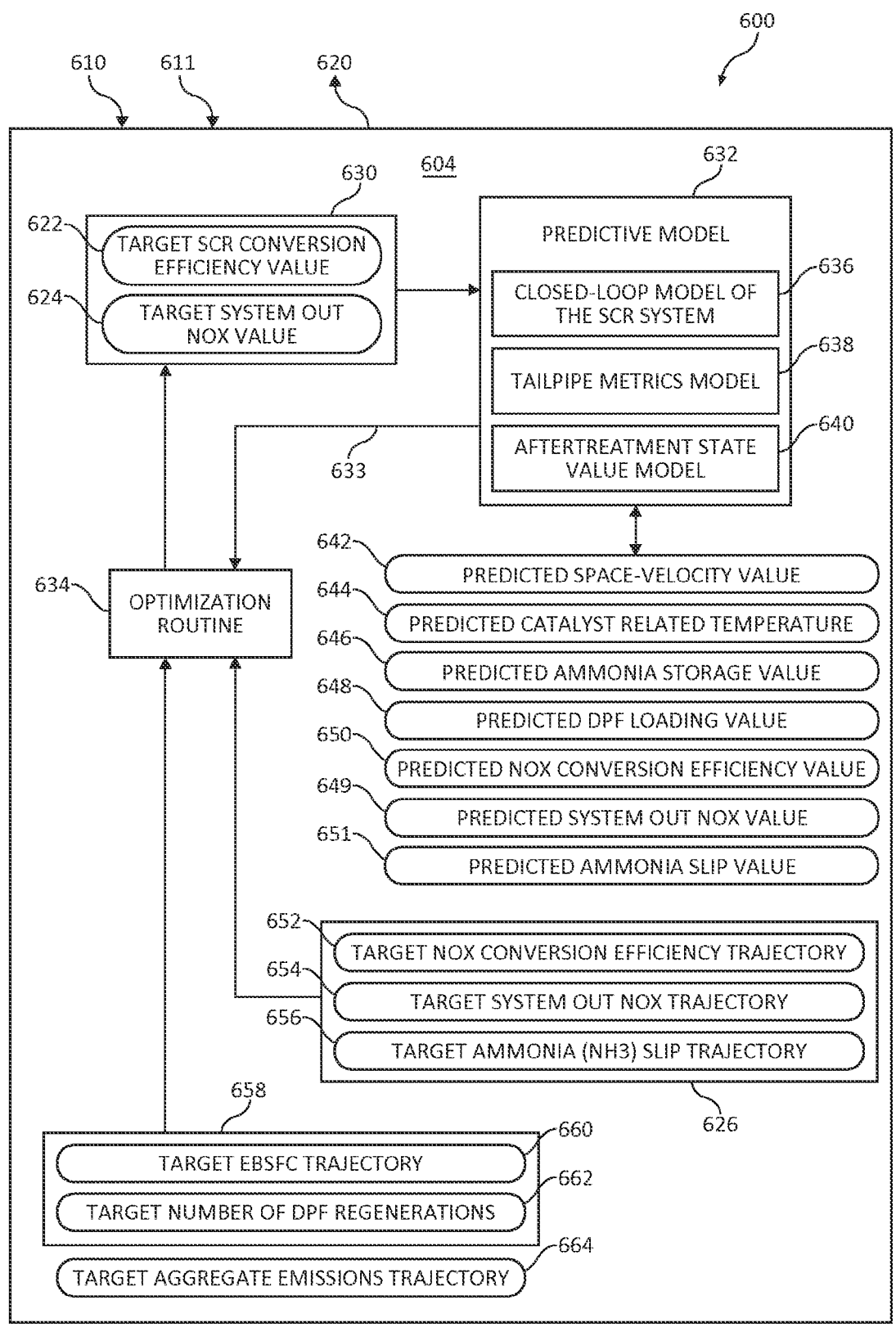
FIG. 9 is a schematic illustration of the aftertreatment target determiner of the processing subsystem of FIG. 8, according to some embodiments.

FIG. 9 is a schematic illustration of the aftertreatment target determiner 604 of processing subsystem 600, according to some embodiments. An example aftertreatment target determiner 604 includes a predictive model 632 and an optimization routine 634, which are optionally utilized to provide the reference value set 620 in response to the basis variable set 610 and the aftertreatment controller specification set 611.

An example aftertreatment target determiner 604 determines a design reference value set 630 in response to the basis variable set 610 and optionally the aftertreatment controller specification set 611. The design reference value set 630 may be determined similarly to, may include similar values to, and may be selected similarly as described with respect to the reference value set 620. Thus, the design reference value set 630 includes at least one of target $NO_X$ conversion efficiency value 622 and a target system out $NO_X$ value 624. These one or more design reference values serve as initial target values that may be modified in iteratively in a cycle until certain conditions are met, at which time the design reference value set 630 is provided as the reference value set 620. In various embodiments, initial design reference value set 630 is a steady state reference value set. In some cases, the steady state reference value set is provided as an initial guess or estimate for the design reference value set 630. In other cases, the design reference value set 630 as the steady state reference value set is provided as the reference value set 620 in response to a steady state operating condition (e.g., the aftertreatment target determiner 604 acts as a unity gain filter).

With initial target values available, an example output set 633 of the predictive model 632 is determined as a step in an iteration. The example output set 633 includes at least one of a predicted $NO_X$ conversion efficiency value 650, a predicted system out $NO_X$ value 649, and a predicted ammonia slip value 651. The values of the example output set 633 optionally represent trajectories of such values over time. The output set 633 may be determined in response to the design reference value set 630 and one or more basis variables of the basis variable set 610. In certain embodiments, the predictive model includes one or more submodels, such as a closed-loop model of the SCR system 636, a tailpipe metrics model 638, and an aftertreatment state value model 640. An example output set 633 is determined and/or updated in response to one or more of these submodels. In particular, the output set 633 is optionally determined and/or updated in response to one or more submodel outputs, such as a predicted space-velocity value 642, a predicted catalyst related temperature 644, a predicted ammonia storage value 646, a predicted DPF loading value 648, and a predicted $NO_X$ conversion efficiency value 650. The example reference value set 620 is optionally determined further in response to the output set 633. Further, the example reference value set 620 is optionally determined in response to the comparison of one or more predicted values in the output set 633 to a corresponding threshold value in the threshold criteria set 626.

Various embodiments of an optimization routine 634 determine when to provide the reference value set 620. An example optimization routine 634 operates to provide the reference value set in response to an output condition to end a cycle of iterations. An example output condition is meeting one or more consumption targets 658, meeting a target aggregate emissions trajectory 664, meeting a predetermined time limit, and/or meeting some other condition. The one or more consumption targets 658 may include a target (EBSFC) trajectory 660 and/or a target number of diesel particulate filter (DPF) regenerations 662. For example, the consumption target may include an improved or minimum fuel or $NO_X$ reductant fluid consumption level.

Until the output condition is met, the aftertreatment target determiner 604 may constrain the design reference value set 630 in response to at least one of the consumption targets 658 and/or the target aggregate emissions trajectory 664. For example, the cycle of iterations continues with a next iteration. An example optimization routine 634 continues to determine a next design variable set 630 with which to begin a next iteration in response to the predictive model output set 633 and optionally the threshold criteria set 626. Though a global optimum could produce the highest efficiency, a local optimum can be preferred over a global optimum, for example, when time constraints do not allow for the processing time required to find the global optimum. The optimization routine 634 may determine the reference value set 620 or the design reference value set 630 further in response to the constrained design reference value set 630.

In various embodiments, the optimization routine 634 constrains the reference value set 620 or the design reference value set 630 further in response to the threshold criteria set 626. In some embodiments, the values selected for the output set 633 correspond to the values selected for the threshold criteria set 626. The output set 633 may be compared to the threshold criteria set 626. Various embodiments of the threshold criteria set 626 include at least one of a target $NO_X$ conversion efficiency trajectory 652, a target system out $NO_X$ trajectory 654, and a target ammonia slip trajectory 656. The design reference value set 630 may be further constrained in response to the comparison.

To summarize, an initial design reference value set 630 is determined in response to the basis variable set 610 and the aftertreatment controller specification set 611. The initial design reference value set 630 may be a best guess, such as a steady state reference value set. This set is provided to a predictive model 632, which provides an output set 633. An optimization routine 634 optionally constrains the design reference value set 630 in response to a threshold criteria set 626 and the output set 633. The design reference value set 620 may be provided as a design reference value set for another iteration in the cycle or may be provided as a reference value set 620 when an output condition is met. In this way, the aftertreatment target determiner 604 is capable of generating an iteratively optimized reference value set 620.

Figure 10:
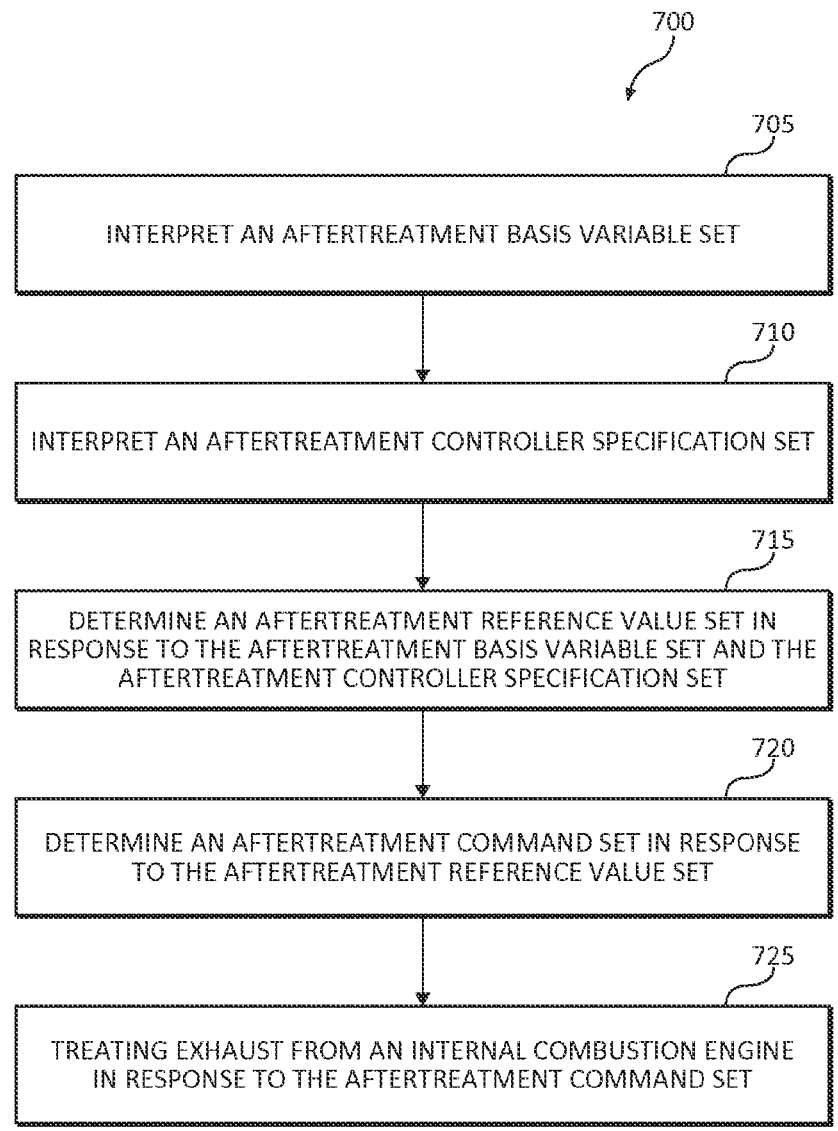
FIG. 10 is a schematic flow chart diagram of an example procedure for controlling the aftertreatment system of FIG. 1, according to some embodiments.

FIG. 10 is a schematic flow chart diagram of an example procedure 700 for controlling the aftertreatment system 120 of the engine system 100, according to some embodiments. The procedure includes an operation 705 to interpret an aftertreatment basis variable set. The aftertreatment basis variable set is selected to characterize the majority of effects of the aftertreatment subsystem. In operation 710, an aftertreatment specification set is interpreted. An example aftertreatment specification set defines the acceptable types of inputs and their range for a controller of the aftertreatment subsystem.

In operation 715, an aftertreatment reference value set is determined in response to the aftertreatment basis variable set and the aftertreatment controller specification set. The aftertreatment reference value set is a set of target values for performance of the air handling subsystem. By including the aftertreatment controller specification set, the target values may be determined within acceptable ranges of the specification of one or more controllers of the aftertreatment subsystem to facilitate more accurate control of the aftertreatment subsystem. Operation 715 may include updating one or more predictive models and/or constraining an aftertreatment reference value set to meet various threshold criteria. In some embodiments, the aftertreatment controller specification set is included in the calibration of the aftertreatment reference value set in response to the aftertreatment basis variable set.

In operation 720, an aftertreatment command set is determined in response to the aftertreatment reference value set. The aftertreatment command set may be the same as the aftertreatment reference value set. Alternatively or in combination, the aftertreatment reference value set may be modified to provide an aftertreatment command set. For example, the aftertreatment command set may be determined in response to constraints (or limitations) of the aftertreatment subsystem. In some embodiments, one or more constraints (e.g., physical, emissions, or otherwise) of the aftertreatment subsystem are included in calibration of the aftertreatment reference value set in response to the aftertreatment basis variable set. In such embodiments, the aftertreatment reference value set is optionally not modified in response to those constraints at run-time.

Finally, in operation 725, exhaust is treated from an internal combustion engine in response to the aftertreatment command set. The treating step may include providing the aftertreatment command set to a controller of the aftertreatment subsystem. The controller of the aftertreatment system may operate components of the aftertreatment system, such as $NO_X$ reductant fluid, to treat exhaust from the internal combustion engine.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the invention should, therefore, be determined with reference to the appended claims, along with the full scope of equivalents to which such claims are entitled.

The following is claimed:

1. A method, comprising:
   interpreting a basis variable set, the basis variable set including a predicted engine speed trajectory, a predicted fueling trajectory, and an ambient value;
   determining a reference value set in response to the basis variable set and an air handling controller specification set, wherein the reference value set includes a mass charge flow (MCF) value and the air handling controller specification set comprises specifications of one or more controllers in an air handling system including acceptable ranges of input values for the one or more controllers in the air handling system; and
   providing the reference value set to an air handling control commander.

2. The method of claim 1, wherein the basis variable set includes an aftertreatment state value and the reference value set includes an exhaust gas recirculation (EGR) fraction value.

3. The method of claim 2, further including interpreting an aftertreatment state value including at least one of a space-velocity value, a catalyst related temperature, an ammonia storage value, a diesel particulate filter (DPF) loading value, and a NOX conversion efficiency value.

4. The method of claim 2, wherein the reference value set includes a pumping work target.

5. The method of claim 1, further delivering air to an internal combustion engine in response to the reference value set.

6. The method of claim 1, further comprising:
   determining a design reference value set in response to the basis variable set and the air handling controller specification set;
   determining an output set of a predictive model in response to the design reference value set and the basis variable set; and
   determining the reference value set further in response to the predictive model output set.

7. The method of claim 6, wherein the predictive model is a control-oriented model (COM) of an air handling system over a trajectory.

8. The method of claim 6, further comprising:
   checking for traversal of a feasible trajectory of an air handling system in response to the predictive model output set; and
   determining the reference value set further in response to the checking for traversal of the feasible trajectory.

9. The method of claim 8, further comprising:
   checking for a hardware limit violation in response to the predictive model output set, wherein the hardware limit violation includes at least one of a turbocharger surge and an excessive turbocharger speed; and
   determining the reference value set further in response to the checking for the hardware limit violation.

10. The method of claim 6, further comprising:
    determining a steady state reference value set in response to the basis variable set and the air handling controller specification set; and
    providing the steady state reference value set as the initial design reference value set.

11. The method of claim 6, further including providing the design reference value set as the reference value set in response to a steady state operating condition.

12. The method of claim 6, further comprising updating the predictive model output set in response to a closed-loop air handling model output, an in-cylinder oxygen estimation model output, and an in-cylinder combustion model output.

13. The method of claim 6, further comprising:
    interpreting a threshold criteria set, wherein the threshold criteria set includes at least one of an objective value subset and a constraint value subset;

checking for a threshold criteria violation in response to the predictive model output set and the threshold criteria set; and determining the reference value set further in response to the checking for the threshold criteria violation.

14. The method of claim 13, further comprising interpreting an objective value subset including at least one of a target open cycle efficiency (OCE) trajectory, a target closed cycle efficiency (CCE) trajectory, a target NOX value, a target smoke value, a target torque value, an MCF target value, and a target EGR fraction value.

15. The method of claim 13, further comprising interpreting a constraint value subset including at least one of a peak cylinder pressure value, a turbocharger surge, an excessive turbocharger speed, a physical limit value, an MCF limit value, an EGR fraction limit value, and a regulatory limit value.

16. The method of claim 13, further comprising:
constraining the design reference value set in response to a target brake thermal efficiency (BTE) trajectory; and
determining the reference value set further in response to the constrained design reference value set.

17. The method of claim 16, further comprising:
determining the target BTE trajectory further in response to a target OCE trajectory and a target CCE trajectory;
determining the design reference value set to include an air handling reference subset, the air handling reference subset including the MCF value and an EGR fraction value;
constraining the air handling reference subset of the design reference value set in response to the target OCE trajectory; and
providing the air handling reference subset to the air handling control commander.

18. The method of claim 17, further comprising:
determining the design reference value set to include a fueling reference subset, the fueling reference subset including a start-of-injection (SOI) command and rail pressure command;
constraining the fueling reference subset of the design reference value set in response to the target CCE trajectory; and
providing the fueling reference subset to a fuel control commander.

19. The method of claim 17, wherein the target BTE trajectory is a local optimum.

20. An apparatus, comprising:
an air handling parameter definer structured to interpret a basis variable set, the basis variable set including a predicted engine speed trajectory, a predicted fueling trajectory, and an ambient value;
an air handling target determiner structured to determine a reference value set in response to the basis variable set and an air handling controller specification set, wherein the reference value set includes at least one of a mass charge flow value and the air handling controller specification set comprises specifications of one or more controllers in an air handling system including acceptable ranges of input values for the one or more controllers in the air handling system; and
an air handling control circuit structured to provide at least one air handling command value in response to the reference value set.

21. The apparatus of claim 20, wherein the basis variable set includes an aftertreatment state value and the reference value set further includes an exhaust gas recirculation (EGR) fraction value.

22. The apparatus of claim 21, wherein the aftertreatment state value includes at least one of a space-velocity value, a catalyst related temperature, an ammonia storage value, a diesel particulate filter (DPF) loading value, and a NOX conversion efficiency value.

23. The apparatus of claim 21, wherein the reference value set includes a pumping work target.

24. The apparatus of claim 20, wherein the air handling target determiner includes a predictive model, the air handling target determiner further structured to:
determine a design reference value set in response to the basis variable set;
run the predictive model in response to the design reference value set and the basis variable set to produce an output set; and
determine the reference value set further in response to the predictive model output set.

25. The apparatus of claim 24, wherein the predictive model is a control-oriented model (COM) of an air handling subsystem over a trajectory.

26. The apparatus of claim 24, wherein the air handling target determiner is further structured to:
determine a steady state reference value set in response to the basis variable set and the air handling controller specification set; and
provide the steady state reference value set as the initial design reference value set.

27. The apparatus of claim 26, wherein the air handling target determiner is further structured to provide the design reference value set as the reference value set in response to a steady state operating condition.

28. The apparatus of claim 25, wherein the predictive model includes one or more of a closed-loop air handling model, an in-cylinder oxygen estimation model, and an in-cylinder combustion model, the predictive model being structured to update the output set in response to the closed-loop air handling model output, the in-cylinder oxygen estimation model output, and the in-cylinder combustion model output.

29. The apparatus of claim 24, wherein the air handling target determiner includes an optimization routine, the air handling target determiner further structured to:
interpret a threshold criteria set, wherein the threshold criteria set includes at least one of an objective value and a constraint value;
run the optimization routine in response to the predictive model output set and the threshold criteria set to check for a threshold criteria violation; and
determine the reference value set further in response to the check for the threshold criteria violation.

30. The apparatus of claim 29, wherein the air handling target determiner is further structured to interpret an objective value including at least one of a target open cycle efficiency (OCE) value, a target closed cycle efficiency (CCE) value, a target NOX value, a target smoke value, a target torque value, a target mass charge flow (MCF) value, and a target EGR value.

31. The apparatus of claim 29, wherein the air handling target determiner is further structured to interpret a constraint value including at least one of a peak cylinder pressure value, a turbocharger surge, an excessive turbocharger speed, a physical limit value, a mass charge flow (MCF) limit value, and an EGR limit value.

32. The apparatus of claim 29, wherein the air handling target determiner is further structured to:
constrain the design reference value set in response to a target brake thermal efficiency (BTE) trajectory; and determine the reference value set further in response to the constrained design reference value set.

33. The apparatus of claim 32, wherein the air handling target determiner is further structured to:
determine the target BTE trajectory further in response to a target OCE trajectory and a target CCE trajectory;
determine the design reference value set to include an air handling reference subset, the air handling reference subset including the MCF value and an EGR fraction value;
constrain the air handling reference subset of the design reference value set in response to the predicted OCE trajectory and the target OCE trajectory; and
providing the air handling reference subset to the air handling control circuit.

34. The apparatus of claim 33, wherein the air handling target determiner is further structured to:
determine the design reference value set to include a fueling reference subset, the fueling reference subset including a start-of-injection (SOI) command and rail pressure command;
constrain the fueling reference subset of the design reference value set in response to the target CCE trajectory; and
provide the fueling reference subset to at least one of a fuel control commander and a fuel control circuit.

35. The apparatus of claim 34, wherein the target BTE trajectory is a local optimum.

36. An engine system, comprising:
an internal combustion engine;
a controller configured to:
interpret a basis variable set, the basis variable set including a predicted engine speed trajectory, a predicted fueling trajectory, and an ambient value;
determine a reference value set in response to the basis variable set and an air handling controller specification set, wherein the reference value set includes at least one of a mass charge flow value and a pumping work target and the air handling controller specification set comprises specifications of one or more controllers in an air handling system including acceptable ranges of input values for the one or more controllers in the air handling system; and
provide at least one air handling command value in response to the reference value set; and
an air handling system in operative communication with the engine and the controller, the air handling system structured to provide air to the engine in response to the at least one air handling command value.

37. The engine system of claim 36, wherein the air handling system includes at least one physical controller and at least one sensor, the at least one physical controller structured to physically control at least one component of the air handling system in response to at least one of the reference value set and the at least one air handling command value, the at least one sensor including at least one of an intake manifold pressure sensor, an intake manifold temperature sensor, an exhaust gas recirculation (EGR) flow sensor, an absolute pressure sensor, a temperature sensor, a wideband exhaust gas oxygen sensor, a humidity sensor, an intake oxygen sensor, and an exhaust gas temperature sensor.

38. The engine system of claim 36, wherein the air handling system includes an exhaust gas recirculation (EGR) system structured to receive exhaust from the engine, wherein the basis variable set includes an aftertreatment state value and the reference value set includes an EGR fraction value, the EGR system being responsive to at least one reference value of the reference value set.

39. The engine system of claim 38, wherein the EGR system is a high pressure EGR system.

40. The engine system of claim 39, wherein the EGR system includes an EGR valve.

41. The engine system of claim 36, wherein the air handling system includes a turbocharging system structured to receive exhaust from the engine and to compress air, the turbocharging system being responsive to at least one reference value of the reference value set.

42. The engine system of claim 41, wherein the turbocharging system includes a waste gate.

43. The engine system of claim 41, wherein the turbocharging system includes a variable geometry turbocharger.

* * * * *